US006748451B2

(12) United States Patent
Woods et al.

(10) Patent No.: US 6,748,451 B2
(45) Date of Patent: *Jun. 8, 2004

(54) DISTRIBUTED COMPUTING ENVIRONMENT USING REAL-TIME SCHEDULING LOGIC AND TIME DETERMINISTIC ARCHITECTURE

(75) Inventors: Randy D. Woods, Midland, MI (US); Wayne P. Dupree, Midland, MI (US); David M. Jachim, Ann Arbor, MI (US); Gerrit H. Verniers, Heirweg (BE); Stephen G. Churchill, Midland, MI (US); George P. Fernandez, Midland, MI (US)

(73) Assignee: Dow Global Technologies Inc., Midland, MI (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/315,202

(22) Filed: May 19, 1999

(65) Prior Publication Data

US 2003/0140172 A1 Jul. 24, 2003

Related U.S. Application Data

(60) Provisional application No. 60/086,737, filed on May 26, 1998.

(51) Int. Cl.[7] .............................................. G06F 15/16
(52) U.S. Cl. ....................................... 709/248; 370/345
(58) Field of Search ................................. 709/217, 219, 709/225, 226, 231, 248, 107; 370/345, 508, 459, 230, 503; 703/17; 713/400; 710/38; 716/4; 714/1

(56) References Cited

U.S. PATENT DOCUMENTS 3,798,650 A    3/1974    McComas et al. .......... 343/225

(List continued on next page.)

FOREIGN PATENT DOCUMENTS

EP    0 183 877    6/1986
EP    0 250 011    12/1987

OTHER PUBLICATIONS

Hao et al, Task Scheduling in Hard Real–Time Distributed Systems on a Bus Local Are Network, IEEE 1992.*

(List continued on next page.)

*Primary Examiner*—Jack B. Harvey
*Assistant Examiner*—Thong Vu

(57) ABSTRACT

A system is presented for a plurality of computer nodes in mutual data communication to execute logic in a coordinated manner. The approach features aligning the definition of the time in the nodes so that each node has essentially the same definition of time; defining a schedule of communications for each computer node, with the schedule having future moments defined for initiating each communication; communicating each schedule to its respective node; and initiating each communication at the time defined in the schedule. The computer network has a message carrier supporting multiple communication paths; a plurality of computers coupled to the message carrier, a clock system for maintaining time synchronism among the computers; and a scheduler coupled to the message carrier for determining the sequence of communication between the computers. The message carrier establishes communication between selected computers based on the time-deterministic tasks being performed by the computers. A computer node in the plurality of computer nodes executes logic in coordination with the other nodes by defining a communication request list of each communication needed by the computer node with any other computer node respective to a future time period, sending the communication request list to the master scheduler, receiving back a communication schedule back from the master scheduler, defining a local task schedule from the communication schedule, and then executing the communication at the scheduled time.

28 Claims, 16 Drawing Sheets

U.S. PATENT DOCUMENTS

| | | | |
|---|---|---|---|
| 3,824,548 A | 7/1974 | Sullivan et al. | 340/146.1 E |
| 3,876,983 A | 4/1975 | Zafiropulo et al. | 340/147 SC |
| 3,921,149 A | 11/1975 | Kreis et al. | 340/172.5 |
| 4,005,266 A | 1/1977 | Lehr et al. | 178/69.1 |
| 4,151,590 A | 4/1979 | Azegami | 364/115 |
| 4,234,958 A | 11/1980 | Pipes et al. | 375/107 |
| 4,287,597 A | 9/1981 | Paynter et al. | 455/12 |
| 4,304,001 A | 12/1981 | Cope | 371/8 |
| 4,352,180 A | 9/1982 | Schulze | 370/58 |
| 4,354,267 A | 10/1982 | Mori et al. | 371/11 |
| 4,410,983 A | 10/1983 | Cope | 371/8 |
| 4,417,334 A | 11/1983 | Gunderson et al. | 370/85 |
| 4,438,494 A | 3/1984 | Budde et al. | 364/200 |
| 4,454,508 A | 6/1984 | Grow | 340/825.05 |
| 4,500,951 A | 2/1985 | Sugimoto et al. | 364/186 |
| 4,538,026 A | 8/1985 | Yasue | 178/2 R |
| 4,554,673 A | 11/1985 | Stevens | 375/118 |
| 4,573,044 A | 2/1986 | McConachie et al. | 340/825.05 |
| 4,582,434 A | 4/1986 | Plangger et al. | 368/46 |
| 4,607,256 A | 8/1986 | Henzel | 340/825.52 |
| 4,607,257 A | 8/1986 | Noguchi | 340/825.69 |
| 4,625,314 A | 11/1986 | Witte | 371/68 |
| 4,630,265 A | 12/1986 | Sexton | 370/85 |
| 4,663,704 A | 5/1987 | Jones et al. | 364/188 |
| 4,689,736 A | 8/1987 | Glaudel et al. | 364/140 |
| 4,690,491 A | 9/1987 | Stein et al. | 350/96.16 |
| 4,697,263 A | 9/1987 | Beaufoy | 370/85 |
| 4,701,756 A | 10/1987 | Burr | 340/825.02 |
| 4,715,033 A | 12/1987 | Saburi | 370/104 |
| 4,727,592 A | 2/1988 | Okada et al. | 455/601 |
| 4,731,784 A | 3/1988 | Keller et al. | 370/88 |
| 4,747,100 A | 5/1988 | Roach et al. | 370/86 |
| 4,761,799 A | 8/1988 | Arragon | 375/107 |
| 4,769,807 A | 9/1988 | Niwa et al. | 370/16 |
| 4,777,487 A | 10/1988 | Boulton et al. | 340/825.5 |
| 4,791,547 A | 12/1988 | Petroff | 364/138 |
| 4,800,561 A | 1/1989 | Ishi | 370/104 |
| 4,813,012 A | 3/1989 | Valeri et al. | 364/900 |
| 4,815,110 A | 3/1989 | Benson et al. | 375/107 |
| 4,816,989 A * | 3/1989 | Finn et al. | 709/248 |
| 4,831,582 A | 5/1989 | Miller et al. | 364/900 |
| 4,837,856 A | 6/1989 | Glista, Jr. | 455/601 |
| 4,855,903 A | 8/1989 | Carleton et al. | 364/200 |
| 4,855,906 A | 8/1989 | Burke | 364/200 |
| 4,890,279 A | 12/1989 | Lubarsky | 370/58.1 |
| 4,890,303 A | 12/1989 | Bader | 375/107 |
| 4,894,846 A | 1/1990 | Fine | 375/107 |
| 4,897,874 A | 1/1990 | Lidinsky et al. | 380/3 |
| 4,899,383 A | 2/1990 | Einolf, Jr. et al. | 380/48 |
| 4,901,218 A | 2/1990 | Cornwell | 364/131 |
| 4,907,232 A | 3/1990 | Harper et al. | 371/36 |
| 4,918,652 A | 4/1990 | Bennington et al. | 364/900 |
| 4,926,418 A | 5/1990 | Cidon et al. | 370/85.5 |
| 4,930,124 A | 5/1990 | de Boisseron et al. | 370/94.3 |
| 4,933,833 A | 6/1990 | Petroff | 364/138 |
| 4,933,936 A | 6/1990 | Rasmussen et al. | 370/85.9 |
| 4,935,886 A | 6/1990 | Choka | 364/578 |
| 4,939,753 A | 7/1990 | Olson | 375/107 |
| 4,951,280 A | 8/1990 | McCool et al. | 370/85.12 |
| 4,970,717 A | 11/1990 | Haas | 370/60 |
| 4,982,400 A | 1/1991 | Ebersole | 370/85.15 |
| 4,992,926 A | 2/1991 | Janke et al. | 364/134 |
| 4,995,040 A | 2/1991 | Best et al. | 371/36 |
| 4,999,832 A | 3/1991 | Chen et al. | 370/85.14 |
| 5,003,531 A | 3/1991 | Farinholt et al. | 370/16.1 |
| 5,151,866 A | 9/1992 | Glaser et al. | 364/483 |
| 5,408,603 A | 4/1995 | Van de Lavoir et al. | 395/161 |
| 5,428,745 A | 6/1995 | de Bruijn et al. | 395/200 |
| 5,428,769 A | 6/1995 | Glaser et al. | 395/575 |
| 5,446,878 A * | 8/1995 | Royal | 714/1 |
| 5,491,625 A | 2/1996 | Pressnall et al. | 364/133 |
| 5,519,603 A | 5/1996 | Allbery, Jr. et al. | 364/133 |
| 5,555,424 A | 9/1996 | Sederlund et al. | 395/800 |
| 5,561,770 A | 10/1996 | de Bruijn et al. | 395/200.06 |
| 5,568,615 A | 10/1996 | Sederlund et al. | 395/200.08 |
| 5,583,757 A | 12/1996 | Baca, Jr. et al. | 364/184 |
| 5,602,754 A * | 2/1997 | Beatty et al. | 716/4 |
| 5,631,825 A | 5/1997 | van Weele et al. | 364/188 |
| 5,640,603 A * | 6/1997 | Meritt et al. | 710/38 |
| 5,655,133 A | 8/1997 | Dupree et al. | 395/800.23 |
| 5,701,439 A * | 12/1997 | James et al. | 703/17 |
| 5,726,668 A | 3/1998 | Clement | 345/1 |
| 5,872,769 A * | 2/1999 | Caldara et al. | 370/230 |
| 5,887,143 A * | 3/1999 | Saito et al. | 709/248 |
| 5,946,297 A * | 8/1999 | Calvignac et al. | 370/230 |
| 5,970,062 A * | 10/1999 | Bauchot | 370/345 |
| 5,996,014 A * | 11/1999 | Uchihori et al. | 709/226 |
| 6,044,091 A * | 3/2000 | Kim | 370/508 |
| 6,195,701 B1 * | 2/2001 | Kaiserswerth et al. | 709/231 |
| 6,199,169 B1 * | 3/2001 | Voth | 713/400 |
| 6,246,702 B1 * | 6/2001 | Fellman et al. | 370/503 |
| 6,317,774 B1 * | 11/2001 | Jones et al. | 709/107 |
| 6,353,618 B1 * | 3/2002 | Hung et al. | 370/459 |

OTHER PUBLICATIONS

Gan et al, End to End Performance of Dynamic Scheduling Technique for Large DSM Applications: Experimental design, 1997.*

Bandwidth Scheduling for Wide–Area ATM Networks Using Virtual..—Anthony Hung (1996) ;cheetah.vlsi.uwaterloo.ca/~kesidis/vft.ps.*

Kaplan, G., "The X–29: Is it coming or going?" *IEEE Spectrum*, Jun. 1985, pp. 54–60.

Patterson, D. A., et al., "Vector Processors", *Computer Architecture: A Quantitative Approach*, Morgan Kaufmann Publishers, Inc., San Mateo, California, 1990, pp. 351–363.

Gavett, J. W., "Project Scheduling", *Production and Operations Management*, Harcourt, Brace & World, Inc., New York/ Chicago/ San Francisco/ Atlanta, 1968, pp. 569–584.

Gehringer, E. F., et al., "The Cm* Hardware Architecture", *Parallel Processing The Cm* Experience*, Digital Equipment Corporation, 1987, pp. 11–18.

Copy of Application for United States Letters Patent Entitled: A Dedicated Context–Cycling Computer, application No. 08/797,967, Dow Reference No. 39927, pp. 1–71 along with 27 pages of drawings.

Ramakrishnan, K.V., "An Event Scheduler for Control Application," *EDN Electrical Design News*, vol. 41, No 12, Jun. 1996, pp. 155–158, 160, 162, 164.

Shin, K.G. et al., "Real–Time Computing: A New Discipline of Computer Science and Engineering," *Proceedings of the IEEE*, vol. 82, No. 1, Jan. 1, 1994, pp. 6–23.

Webopedia entry, "Circuit Switching", downloaded from http://www.webopedia.com/TERM/c/circuit_switching-.html on Sep. 15, 2003, pp. 1–2 (copyright 2003 Jupitermedia Corporation).

Cisco Systems, Inc., "ATM Inernetworking", downloaded from http://www.cisco.com/warp/public/614.12.html on Sep. 15, 2003, pp. 1–84 (copyright 1996 Cisco Systems, Inc.).

* cited by examiner

DISTRIBUTED COMPUTING ENVIRONMENT USING REAL-TIME SCHEDULING LOGIC AND TIME DETERMINISTIC ARCHITECTURE

CROSS-REFERENCE TO PRIOR APPLICATION

This application claims the benefit of U.S. Provisional Application No. 60/086,737 filed May 26, 1998.

FIELD OF THE INVENTION

This invention is directed to the field of data processing control systems, particularly to integrated systems where a plurality of computers execute their logic in a coordinated manner within a network.

BACKGROUND OF THE INVENTION

The primary application of the system described in this specification is for computerized control of machines deployed on a large physical scale (e.g. a chemical manufacturing facility), although benefits to endeavors related to plural computer processors, parallel computer processors, and networked computer processors are also enabled.

When computational demands or geographical constraints require the physical distribution of computing facilities (e.g. such as for process control in a large, geographically dispersed chemical plant), implementation factors (such as product quality) may benefit from centralized coordination of the computing tasks. This invention describes a system and method for enabling a plurality of geographically dispersed computers to be networked for enabling time coordinated inter-activity. This resultant network enables task coordination and facilitates the implementation of other qualities beneficial to the task being performed by the system—qualities such as redundancy, security, and high throughput.

One embodiment of a system showing such substantive real-time networking to a set of physically distributed remote field units for use in a process control system is described the U.S. Pat. No. 5,428,769 issued on Jun. 27, 1995 and entitled "Process control interface system having triply redundant remote field units" to Glaser, Robert S.; Hoy, Robert S.; Fernandez, G. Paul; and Grai, Timothy J. While the system is adequate for many process control situations, the networking methodology effectively addresses each system in each time period on the presumption that there is a need to do so; however, many of these addressing cycles are unnecessary if all variables for exchange are stable—a more elegant scenario from the standpoint of network efficiency would provide for communications only when the status of either the inputs or the outputs require change.

Physical distribution of computing facilities combined with centralized coordination of the computing tasks is also a driving concept in high performance processors characterized by parallelism. Vector processors, as discussed in sections 7.1 and 7.2 ("Vector Processors") of Computer Architecture A Quantitative Approach by John L. Hennessy and David A Patterson (Morgan Kaufmann; San Mateo, Calif.; 1990; pages 351–363) are one manifestation of such systems, and processor-memory pair approaches such as the Cm★ design discussed from pages 11 to 18 of "Parallel Processing—The Cm★ Experience" by E. F. Gehringer, D. P. Siewiorek, and Z. Segall (Digital Press via Editorial Inc.; Rockport, Mass.; 1987) provide a second example of these types of approaches.

Centralized coordination of computing tasks in a scheduled context for the future also draws on concepts from traditional project scheduling such as is discussed from pages 569 to 584 of the text Productions and Operations Management by J. William Gavett (Harcort, Brace, and World; New York; 1968).

Process control systems development is characterized by an ever-increasing incorporation and management of issues at large in the system being controlled, requiring that a comparably larger amount of logic on a comparably larger amount of data be executed in a time frame which is not permitted to expand. This can be achieved to some degree by hardware which processes logic more quickly and holds more data in an addressed physical store, but there are substantial costs in pursuing this solution. What is needed to resolve the ability of future systems to effectively expand their comprehensive treatment of the control situation is to truly provide a solution path for enabling a very large number of distributed computers to execute massive amounts of logic in a mutual manner which is time-synchronous across an entire network. The present invention provides such a method and system.

SUMMARY OF THE INVENTION

To achieve the above objects, the present invention provides a computer implemented method for enabling a plurality of computer nodes in mutual data communication to execute logic in a coordinated manner by aligning real-time time between the plurality of computer nodes so that each computer node has essentially the same real-time time;

defining a schedule of communications for each computer node, with the schedule having a different time in the future defined for initiating each respective communication;

communicating each schedule to its respective computer node; and initiating each communication from each node at the time defined in its schedule.

Additional features and advantages of the present invention will become more fully apparent from a reading of the detailed description of the preferred embodiment and the accompanying drawings.

DETAILED DISCUSSION OF PREFERRED EMBODIMENTS

Figure 1:
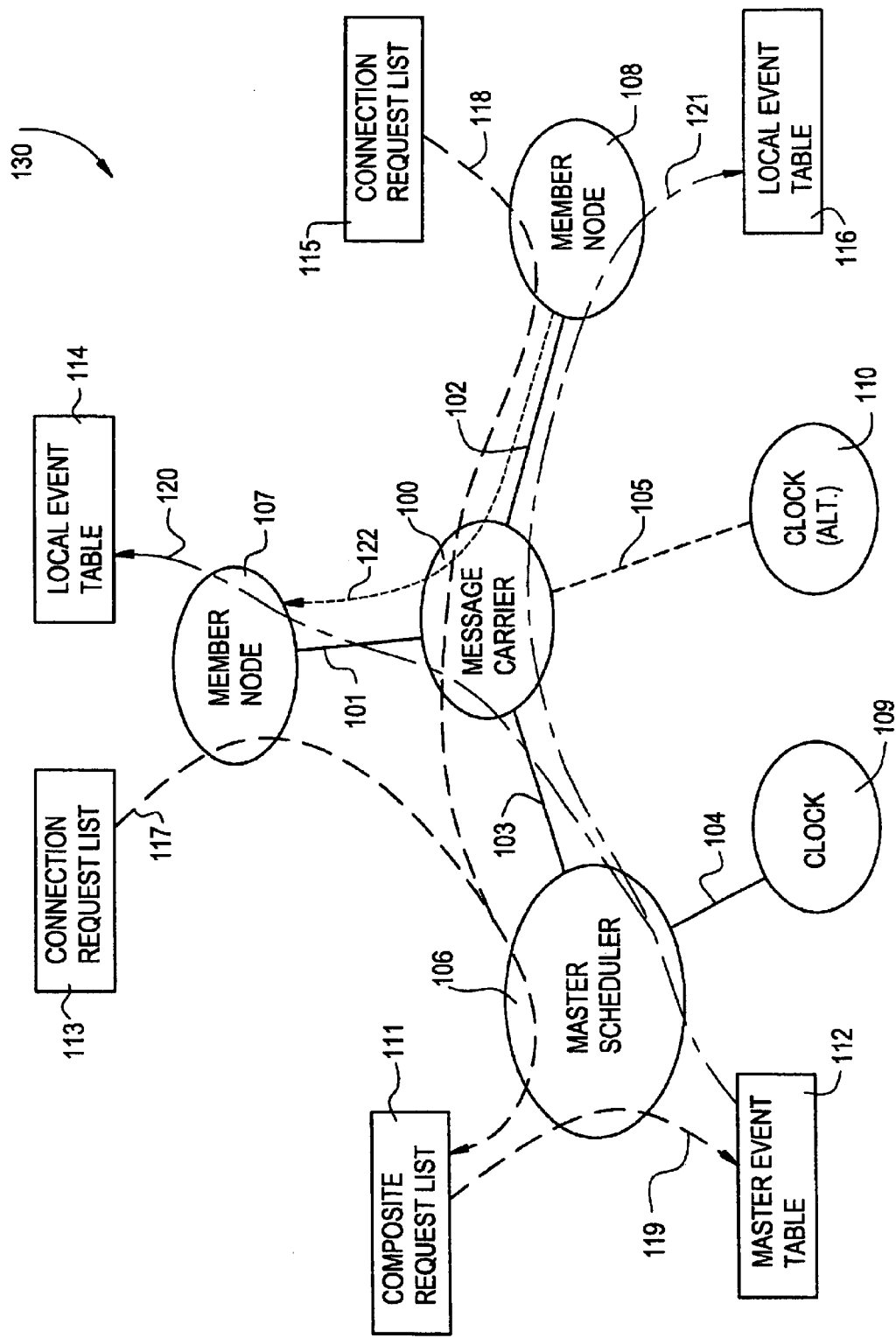
FIG. 1 presents a diagram of the data flows between the various elements in a distributed network.

As an introduction to this part of the specification, the system and method of the present invention implement centralized scheduling of cooperatively performed tasks, time deterministic event operations, and effective real-time synchronization and alignment of oscillators respective to the plurality of computers (also referenced as "member nodes") on the network. In this regard, the time deterministic network involves communicating between separate computing elements based on time rather than on some event (examples of events are the reception of a token or the detected availability of a particular bus). Centralized scheduling of cooperatively performed tasks, time deterministic event operations, and effective real-time synchronization and alignment of oscillators respective to the plurality of computers on the network requires that the computers share an essentially common view of the datalogical representation of an actual moment in real-time. This means, for instance and assuming for this example (without limitation to the scope of the present invention) a system wide-precision requirement of one millionth of a second, that two different computers in the system essentially perceive that, when the moment of time in real-time defined by an undisputed source respective to the network is 08:00:0000000 hours, that the first of the two computers has a datalogical representation of the moment in real-time between 07:59:9999995 and 08:00:0000005 and that the second of the two computers also has a datalogical representation of the moment in real-time between 07:59:9999995 and 08:00:0000005; as can be appreciated, the difference in the datalogical representation of the moment in real-time between the two computers is no more than 1 millionth of a second.

When the computers in a distributed computing network share an essentially common view of the datalogical representation of an actual moment in real-time, they can then be programmed to perform specific tasks based on time. Tasks which involve multiple computers can then be scheduled centrally and a basis is established for time-dependent activities to be invoked on geographically dispersed computers in a deterministic manner. In this regard, determinism in real-time operations characterizes the occurrence of a predefined event at a predefined moment of real-time.

The use of such time coordination in communications between computers also facilitates the employment of active redundancy. In active redundancy, there are two or more computers which are each executing essentially identical logic, exchanging the results from these executions, optionally arbitrating the independently derived results to come to a commonly understood mutual conclusion for further use, and acting to concurrently effect the result. This process proceeds most effectively when data received by each computer is shared with the other computer(s) executing the same logic prior to arbitrating the results, so there must be some mechanism by which the time to begin the arbitration process is mutually determined. In the present invention, the mechanism for providing time synchronization between the redundant computers and to schedule the tasks related to a communication instance is (1) to provide an essentially identical datalogical representation of the moment in real-time time among the computers; (2) to use a scheduling approach to define in each computer the moment in time when the communication instance in that computer will occur; and (3) to then to implement the appropriate sending, receiving, and linkage tasks in each system involved in the communication instance at the time defined for the communication instance. In this way, the time at which the referenced arbitration task will be performed is pre-determined after the communications tasks have been scheduled (as opposed to the approach of waiting to determine the start time of the arbitration task after the communication tasks have actually executed).

The scheduling approach is implemented by execution of scheduling logic. The concept of logic relates to software (a computer program) whose purpose is achieved in execution by an enabling system of electrical circuitry (usually denoted by the term "computer"). The scheduling logic used for the scheduling of communications is based on analysis of demands for the resources (e.g. specific computers, data space within each computer, execution time in each computer, and specific circuits within each computer) which are being scheduled. This scheduling logic is used in the scheduling of network communications, but it has further applicability in the scheduling of any resources which require interaction among one another, and it is especially suited for real-time applications. The scheduling logic is further designed to be efficient respective to the resources it is responsible for scheduling and to be predictable as to the amount of time required to generate its output, a schedule, from the inputs (i.e. a collection of connection requests between any two computers on this network). In achieving this task, the scheduling logic schedules the available resources with the highest demand for the time that the schedule is being created. Reflecting the nature of (1) evaluating the resources with the highest demand at each point in the schedule and (2) giving precedence to the resources which have the highest demand, the particular scheduling logic method described in this specification is also referred to herein as Apparent Critical Resource, or ACR, scheduling logic. In this regard, in the preferred embodiment, the scheduling logic is not iterative in the sense that, once a particular task is scheduled, it is NOT removed from the schedule in order to pursue an alternative to its placement in the schedule. It is this quality which enables the preferred ACR scheduling logic type of scheduling logic to be well-suited for real-time applications.

In the application of scheduling logic to the scheduling of network communications, there are transmission resources and reception resources which are to be considered. Each time a network communication is scheduled, a transmission resource is associated with a reception resource. In the scheduling of network communications, there are responsibilities which are handled by the master scheduler and those which are handled by the member nodes.

The described embodiments also provide a computer network architecture, having a message carrier with a plurality of computers coupled to it; a clock system (accessible by all computers in the network) for maintaining time synchronism among the computers; and a scheduler for determining the sequence of communication between the computers by causing the message carrier to establish communication between selected computers based on time-deterministic tasks being performed by the computers. In this regard, a global time system for aligning the sense of time in the set of computers to a globally defined reference is used in some embodiments.

The described embodiments also provide for concurrency in communications between computers via the message carrier.

The described embodiments also provide a computer implemented method for scheduling tasks for resource objects in a plurality of resource objects functioning as a collective group.

The described embodiments also provide a method by which different computers can align their definition of time by adjusting their oscillator's rate of oscillation.

The computer network architecture is enabled with a message carrier supporting multiple communication paths; a plurality of computers coupled to the message carrier, with each computer being programmed to perform time-deterministic tasks by cycling through a plurality of different operating states, including a communication state; a clock system accessible by all the computers for maintaining time synchronism among the computers; and a scheduler coupled to the message carrier for determining the sequence of communication between the computers by enabling the message carrier to establish communication between selected computers based on the time-deterministic tasks being performed by the computers.

A computer node (element for computing with an independent central processing unit) in the plurality of computer nodes can execute logic in coordination with the other nodes by being connected to a message carrier along with the other computer nodes where there is also a provision for (a) master scheduling capability in one computer node to establish a master scheduler; (b) defining, in each computer node, a communication request list of each communication needed by the computer node with any other computer node respective to a future time period; (c) sending of the communication request list from each computer node to the master scheduler via the message carrier; (d) receiving of, in each computer node, a communication schedule from the master scheduler via the message carrier; and (e) defining, in each computer node, a local task schedule from the communication schedule.

The above approach enables a plurality of member nodes in a system to execute a large amount of logic in a coordinated manner on a group of distributed platforms.

In performing the above, the step of defining a reference moment time value is performed in one embodiment by the master scheduler.

In performing the above, the step of defining a communication request list in each member node in one embodiment limits the communications to a maximum number in the future time period and each communication has an duration time attribute and the value of the duration time attribute is less than a fixed maximum value in order to achieve efficient operation.

Use of a global time system in one embodiment enables a universal understanding of time across a large number of different computer nodes (member nodes) in an extended system.

The method for scheduling involves a process of scheduling tasks for resource (member) objects in a plurality of resource objects functioning as a collective group; and this computer implemented process (called an "apparent critical resource" process) involves the steps of:

defining a set of future tasks for the collective group;

defining each resource object needed for each future task in the set of future tasks;

defining each interaction needed between any two resource objects respective to the set of future tasks;

defining a use instance for each resource object in achieving each interaction where the use instance has an use duration attribute value;

defining an accessing resource object and an accessed resource object respective to each use instance;

determining a summed accessing time value for each accessing resource object as a sum of all use duration attribute values for all use instances respective to that resource object when it is the accessing resource object;

determining a summed accessed time value for each accessed resource object as a sum of all use duration attribute values for all interactions between the accessed resource object and the accessing resource object;

defining a set of sequential future time increments within a scheduling period in a schedule;

scheduling, into the earliest available time in the first future time increment, a future resource interaction event based on the first available future task in the set of future tasks between (a) the accessing resource object having the highest summed accessing value respective to the set of future tasks and (b) the accessed resource object having the highest summed accessed value respective to the set of future tasks (if a use instance exists between the accessed resource object and the accessing resource object—the future resource interaction event in the schedule record has an initiation time equal to the earliest available time in the schedule, an accessing resource object identifier attribute respective to the accessing resource object, an accessed resource object identifier attribute respective to the accessed resource object, and the aforementioned use duration attribute value)

removing from scheduling candidacy the use instance respective to the accessed resource object in the scheduled future resource interaction event and the accessing member object identifier attribute in the scheduled future resource interaction event to redefine the set of future tasks to those future tasks for which interactions have not been scheduled;

repeating the steps of determining a summed accessed value, determining a summed accessing value, scheduling a future communication task, and removing all use instances respective to scheduled resource objects until all use instances have been scheduled which can be scheduled into the first future time increments; and recurrently executing the steps of determining a summed accessed value, determining a summed accessing value, scheduling a future resource interaction event, removing all resource objects respective to scheduled resource objects, and repeating such steps until all resource interaction events have been scheduled which can be scheduled into each future time increment and until all resource interaction events have been scheduled into the scheduling period.

In one embodiment, the message carrier has a plurality of channels for permitting concurrency in the communication events, the step of scheduling being respective to the plurality of channels as a group wherein the earliest available time is respective to any channel in the message carrier.

In some embodiments, each member node has a variable speed oscillator for adjusting a local clock to align with a global clock on the network. Time alignment logic and oscillator rate adjustment logic for execution by the computer circuitry are also provided to achieve rapid time alignment of the particular member node (computer node).

The message carrier is enabled with a network topology which can be manifested (in the preferred embodiment) with a crossbar switch, or, in an alternative embodiment, with a radio frequency communications system.

FIG. 1 presents a data flow diagram 130 of the general elements and associated data flows between the various general elements in a distributed network and shows a message carrier 100, a first member node 107 and a second member node 108, a master scheduler 106 for coordinating communications between member nodes 107, 108 via data communication path 101 and data communication path 102, clock alternatives (as clock 109 and alternative clock 110) for achieving synchronization between member nodes 107, 108 (via data communication path 104, data communication path 105, data communication path 101, and data communication path 102), and the primary data tables and exchanges required to interact effectively in this distributed computing environment (via data communication path 118, data communication path 117, data communication path 119, data communication path 120, and data communication path 121).

The clock 109 is distributed to the member nodes through the message carrier from the master scheduler (alternatively, the message carrier 100 could distribute an alternative local clock 110 to the member nodes 107, 108 and to the master scheduler 106). This permits all nodes attached to the message carrier to share a common view of time. In this regard, clock 109 represents a global clock for use around the physical globe (e.g. in North America, in Europe, and in Asia) where the alternative clock 110 represents a clock which has been designated for the network referenced only by message carrier 100 and where a computer executing aspects of message carrier 100 arbitrarily defines time for its affiliated computers in the distributed network. Clock 109 or clock 110 periodically output a common clock signal via either linkage 104 or 105, respectively.

Each member node 107, 108 is responsible for receiving the common clock signal; effectively "synchronizing" (aligning the definition of time in the node to a close tolerance with the definition of time respective to the common clock signal to create a system timebase operating in synchronism with an established clock frequency and anchor point) to that common clock signal; receiving an appropriate local event table 114, 116 from the master scheduler 106; formulating a respective task execution list based on the received local event table 116, 114 and any additional tasks which are not described in the local event table 114, 116; executing the task execution list; generating the request list of communications 113, 115; and transmitting the request list of communications to the master scheduler 106. Each member node 107, 108 generates a connection request list 113, 115 based on the tasks required of the node 107, 108, and forwards these requests at a prescribed time through the message carrier 100 to the master scheduler 106. The master scheduler 106 combines the connection request lists 113, 115 from the member nodes into a composite request list 111, which it uses to generate a communications schedule represented in the master event table 112. This master event table 112 is then broken apart into sections applicable to each of the member nodes 107, 108 and sent through the message carrier 100 (also at prescribed times) to the member nodes 107, 108 for storage in local event tables 114, 116. The local event tables 114, 116 are used in the member nodes 107, 108 to control timing for applicable time dependent tasks, including communications with other member nodes.

Figure 2:
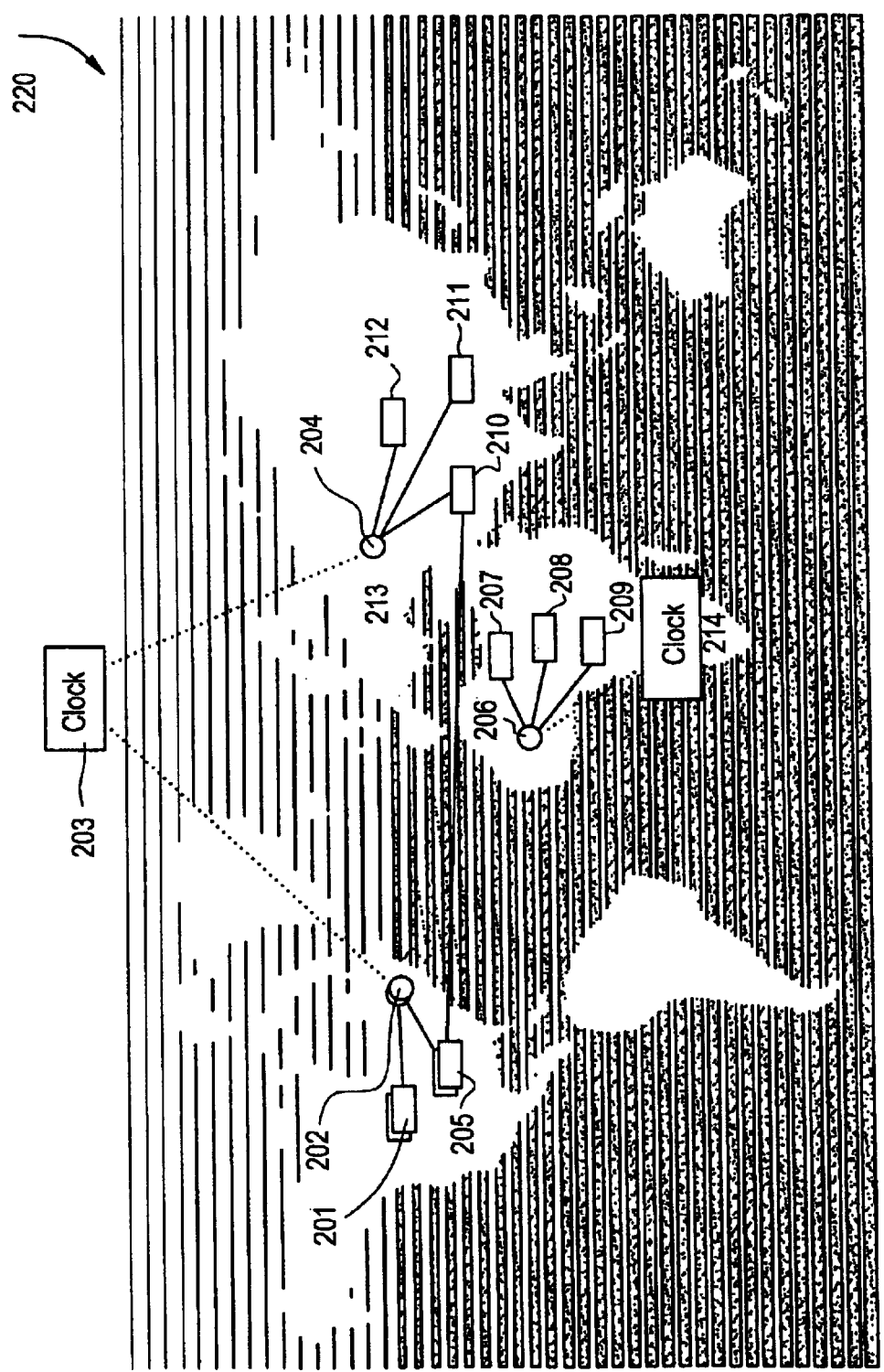
FIG. 2 depicts a distributed network of computing elements which are resident in physically different locations throughout the world. This figure includes a network of computing elements, a master scheduler, and a common source of time.

FIG. 2 depicts a distributed network 220 of computing elements which are resident in physically different locations throughout the world to show an instance of the situation abstracted in the data flow diagram 130 of FIG. 1. This figure includes a network of computers 201–214 and two sources of time in clock 203 and clock 214 representing time sources respective to the data flow diagram clocks 109, 110; in this regard, FIG. 2 shows clock 203 as the basis for time definition for all systems in North America and Eurasia while clock 206 defines a basis for time definition for the less globally dispersed domain of computers 206, 207, 208, 209, and 214 in Africa. It should be noted that clock 203, then, "maps" to clock 109 in the data flow diagram context of FIG. 1 and that clock 214 "maps" to clock 110 in the data flow diagram context of FIG. 1. FIG. 2 thereby depicts two possible configurations for distributed computing environments (facilitating the associated message carriers 100, master schedulers 106, and clocks 104, 105). A distributed computing environment can be located in a geographically limited area or dispersed throughout the world. When spread across large geographical areas, the clock 203 is preferably a satellite timing distribution system such as the Global Positioning System.

Figure 3:
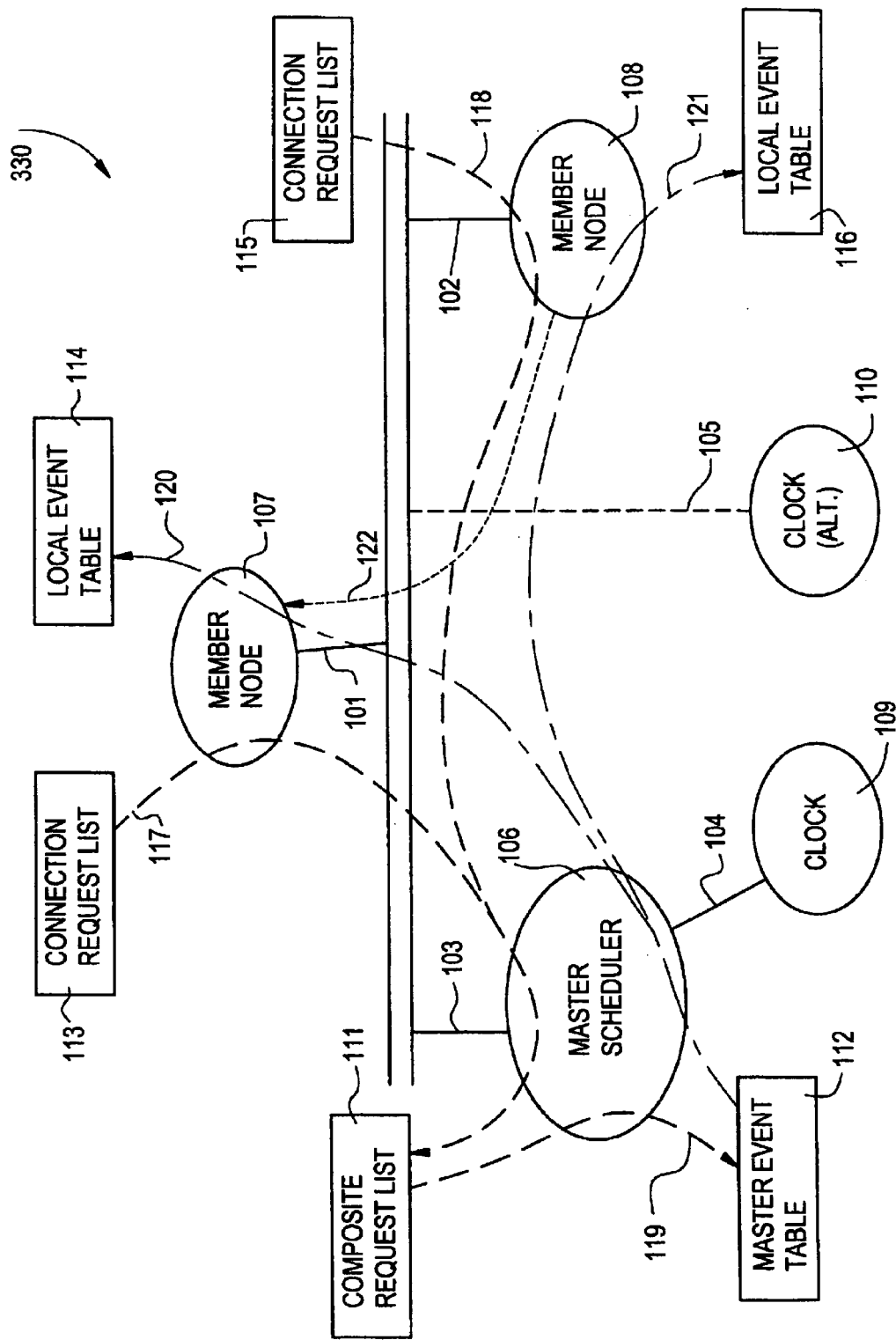
FIG. 3 presents a diagram of a network in a bus structure.

FIG. 3 presents a diagram of a network in a bus structure 330. FIG. 3 shows the fundamental components of FIG. 1 except that the message carrier 100 is a bus 300 connecting the member nodes 107, 108, to the master scheduler 106.

Figure 4:
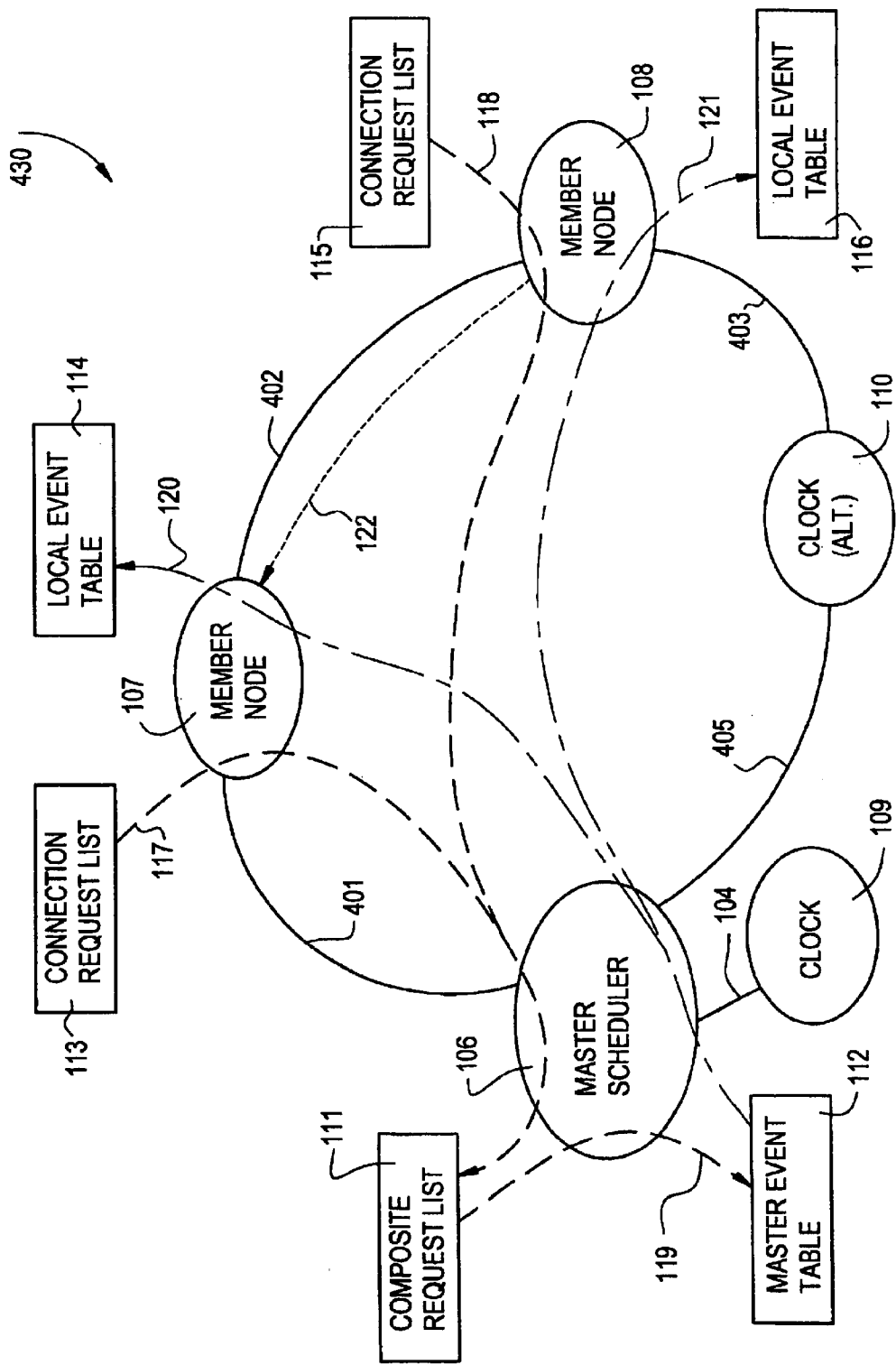
FIG. 4 shows a distributed computing environment where the network is implemented in a ring topology.

FIG. 4 shows a distributed computing environment where the network is implemented in a ring topology 430. FIG. 4 shows the fundamental components of FIG. 1 except that the message carrier 100 is a ring enabled by ring segments 402, 403, 405, and 401 to effectively connect the member nodes 107, 108, to the master scheduler 106.

Figure 5:
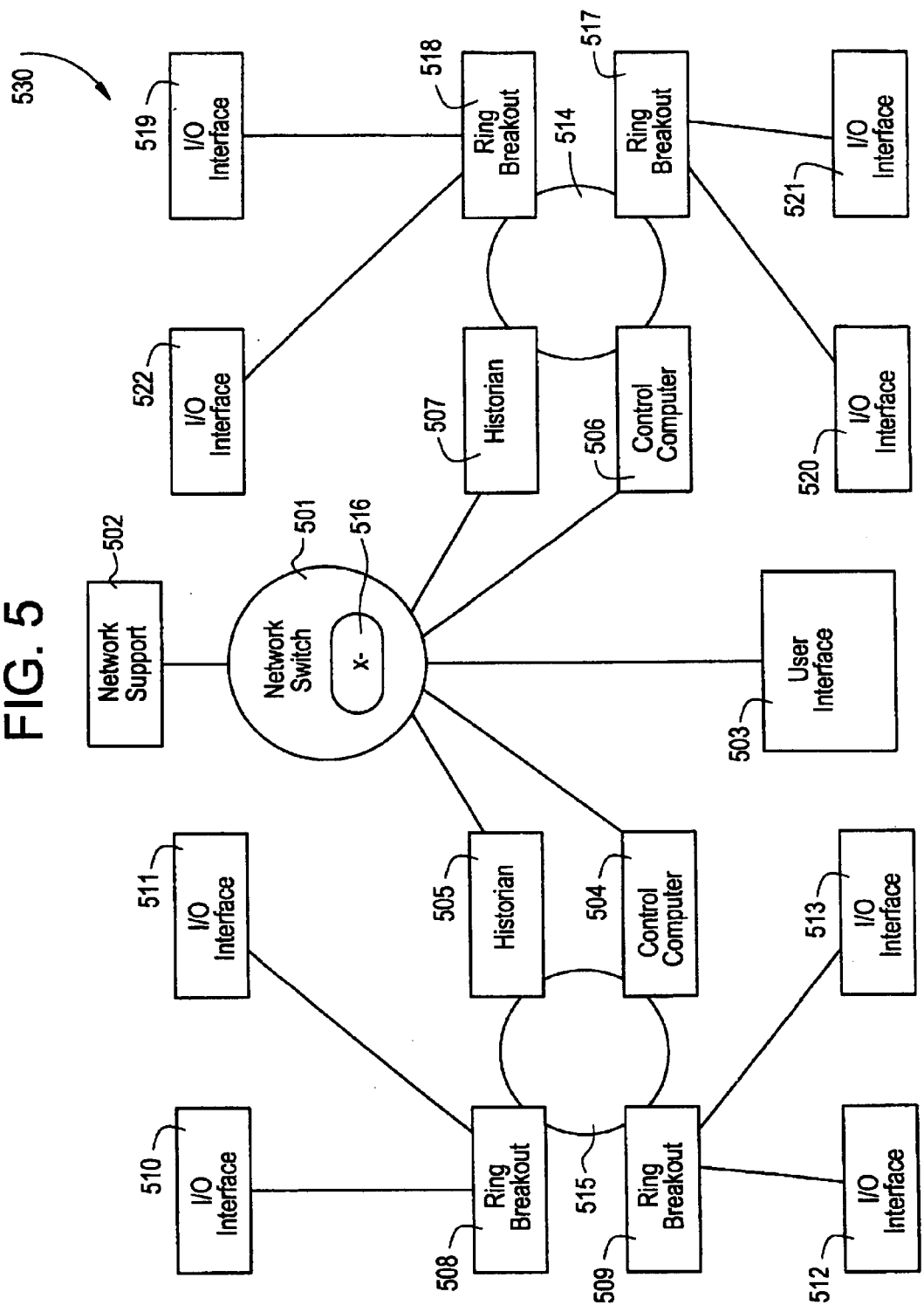
FIG. 5 presents a diagram of a network in a switched star topology which is a preferred network architecture embodiment.

FIG. 5 presents a diagram of a network in a switched star topology 530 which is a preferred network architecture embodiment. FIG. 5 also shows the fundamental components of FIG. 1 except that the message carrier 100 is explicitly a switched network implemented in a star topology which connects the member nodes 107, 108 and the master scheduler 106, and that this master scheduler 106 is embedded into the network switch 501. This diagram shows the preferred embodiment as it could be used in a large manufacturing process (a manufacturing process referencing the effecting of goods manufacture in an apparatus whose movable components are modified in real-time using control signals from a computer control system executing logic reading measurements from the apparatus and outputting the control signals) through a large number of input/output processing devices and computing platforms in a potentially geographically distributed arrangement. The star topology network 530 enables the reading of measurements and outputting of control signals respective to the apparatus for manufacture through I/O (input signal/output signal) interface 510, I/O interface 511, I/O interface 522, I/O interface 519, I/O interface 512, I/O interface 513, I/O interface 520, and I/O interface 521. I/O interface 510, I/O interface 511, I/O interface 512, and I/O interface 513 are all joined via ring breakout 508 and ring breakout 509 to control computer 504 and historian computer 505 through local network 515. In a similar manner, I/O interface 522, I/O interface 519, I/O interface 520, and I/O interface 521 are all joined via ring breakout 518 and ring breakout 517 to control computer 506 and historian computer 507 through local network 514. I/O interface 510, I/O interface 511, I/O interface 512, I/O interface 513, ring breakout 508, ring breakout 509, control computer 504, historian computer 505, and local network 515 operate with local logical integrity and high real-time datalogical cohesion. In a similar manner, I/O interface 522, I/O interface 519, I/O interface 520, I/O interface 521, ring breakout 518, ring breakout 517, control computer 506, historian computer 507, and local network 514 operate with local logical integrity and high real-time datalogical cohesion. Cohesion between (a) I/O interface 510, I/O interface 511, I/O interface 512, I/O interface 513, ring breakout 508, ring breakout 509, control computer 504, historian computer 505, and local network 515 and (b) I/O interface 522, I/O interface 519, I/O interface 520, I/O interface 521, ring breakout 518, ring breakout 517, control computer 506, historian computer 507, and local network 514 via messaging is enabled by network switch 501 which implements (1) communications for provision of an essentially identical datalogical representation of the moment in real-time time among the computers; (2) master scheduler 106 processes to define for control computer 506, historian computer 507, control computer 504, historian computer 505, user interface 503, network support 502, and network switch 501 each moment in time when each communication instance between any two of computer 506, historian computer 507, control computer 504, historian computer 505, and user interface 503 via the use of network switch 501 will occur; and (3) appropriate sending, receiving, and linkage tasks respective to components involved in the communication instance at the time defined for the communication instance. Network support 502 is also coordinated as a node into switched star topology 530 as a single source of information for defining acceptable communication partners in switched star topology 530 and also for accumulating and providing access to diagnostic information in switched star topology 530. Network switch 501 references network support 502 for a listing of acceptable communication partners in switched star topology 530 and confirms communication instance requests against this listing in defining sending, receiving, and linkage tasks.

In one embodiment, I/O interface 522, I/O interface 519, I/O interface 520, and I/O interface 521 are facilitated by a process control system such as is described in U.S. Pat. No. 5,555,424 (24Sederlund, et. al.) issued on Sep. 10, 1996 and entitled "Extended Harvard architecture computer memory system with programmable variable address increment" to Sederlund, Edward R.; Lindesmith, Robert J.; Root, Larry A.; Dupree, Wayne P.; and Thomas, Lowell V. This patent is expressly incorporated herein by reference in the present application for showing a manner of making and using the present invention.

In a more preferred embodiment, I/O interface 522, I/O interface 519, I/O interface 520, and I/O interface 521, are facilitated via a redundant process control computer system in a general process control system using two process control computers (such as the process control computer described in 24Sederlund, et.) as is described in U.S. Pat. No. 5,583,757 (Baca, Jr., et. al.) issued on Dec. 10, 1996 and entitled "Method of input signal resolution for actively redundant process control computers" to Baca, Jr., Eloy; Dupree, Wayne P.; Grinwis, Donald J.; Kanse, Johannes C.; Pelletier, Douglas P.; and Schulze, Oscar E. This patent is expressly incorporated herein by reference in the present application for showing a manner of making and using the present invention.

An embodiment of a system for achieving data access for the process control computer described in 24Sederlund, et al. is described in U.S. Pat. No. 5,568,615 (15Sederlund, et. al.) issued on Oct. 22, 1996 and entitled "Stealth interface for process control computers" to Sederlund, Edward R.; Thomas, Nadene T.; Lindesmith, Robert J.; and Cowles, Russell W. This patent is expressly incorporated herein by reference in the present application for showing a manner of making and using the present invention.

An embodiment of a system providing a remote field unit for use with the process control computer described in 24Sederlund, et al. is described the U.S. Pat. No. 5,428,769 (69Glaser, et. al.) issued on Jun. 27, 1995 and entitled "Process control interface system having triply redundant remote field units" to Glaser, Robert S.; Hoy, Robert S.; Fernandez, G. Paul; and Grai, Timothy J. This patent is expressly incorporated herein by reference in the present application for showing a manner of making and using the present invention.

An embodiment of a system providing an interface for reading electrical current in power distribution systems for use with the field unit described in 69Glaser, et. al. is described in U.S. Pat. No. 5,151,866 (66Glaser, et. al.) issued on Sep. 29, 1992 and entitled "High speed power analyzer" to Glaser, R. Steven and Bade, Jeffrey M. This patent is expressly incorporated herein by reference in the present application for showing a manner of making and using the present invention.

An embodiment of a system providing a high speed gateway for use with the redundant process control computer system described in Baca, et al. and the system for achieving data access for the process control computer described in 24Sederlund, et al. is described in (a) U.S. Pat. No. 5,519,603 (Allbery, Jr., et. al.) issued on May 21, 1996 and entitled "Intelligent process control communication system and method having capability to time align corresponding data sets" to Allbery, Jr., James D.; Troisi, Peter A.; Johnson, Susan J.; Cullen, James H.; Butler, Richard L.; Ferreira, James P.; Ellison, Joseph; Patel, Chiman L.; Uban, James E.; and Schultz, Dale H.;

(b) U.S. Pat. No. 5,428,745 (45de Bruijn, et. al.) issued on Jun. 27, 1995 and entitled "Secure communication system for re-establishing time limited communication between first and second computers before communication time period expiration using new random number" to de Bruijn, Ronny P.; Verboven, Marc L. K.; van Weele, Leonardus A.; Vermeire, Roger R.; Schulze, Oscar E.; Schultz, Dale H.; and Bell, Brian G.; and (c) U.S. Pat. No. 5,561,770 (70de Bruijn, et. al.) issued on Oct. 1, 1996 and entitled "System and method for determining whether to transmit command to control computer by checking status of enable indicator associated with variable identified in the command" to de Bruijn, Ronny P.; van Weele, Leonardus A.; Verboven, Marc L. K.; Vermeire, Roger R.; Schulze, Oscar E.; Bell, Brian G.; and Schultz, Dale H.

These patents are expressly incorporated herein by reference in the present application for showing a manner of making and using the present invention.

An embodiment of a system providing human interfacing for use with the redundant process control computer system and interfaces described in the above patents is described in U.S. Pat. No. 5,631,825 (van Weele, et. al.) issued on May 20, 1997 and entitled "Operator station for manufacturing process control system" to van Weele, Leonardus A.; de Bruijn, Ronny P.; Vermeire, Roger R.; Zemering, Christo; and Lenting, Ben. This patent is expressly incorporated herein by reference in the present application for showing a manner of making and using the present invention. While this human interface system could be used as one user interface in each or any one of I/O interface 522, I/O interface 519, I/O interface 520, and I/O interface 521, it should be noted that user interface 503 is preferably designed for interface via network switch 501 to the entire set of systems in a particular instance of switched star topology 530.

Embodiments of systems providing real-time interpretation of application program code executing in the above systems are described (a) in U.S. Pat. No. 5,491,625 (Pressnall, et. al.) issued on Feb. 13, 1996 and entitled "Information display system for actively redundant computerized process control" to Pressnall, Dana W.; Polishak, Jeffery T.; Felix, Bradley K.; Durisin, Michael J.; and Ellison, Joseph. and (b) in U.S. Pat. No. 5,408,603 (Van de Lavoir, et. al.) issued on Apr. 18, 1995 and entitled "Global process control information system and method" to Van de Lavoir, Ronny; Follon, Marinus (Neerpelt, BE); and Ravenscroft, Ian. These patents are expressly incorporated herein by reference in the present application for showing a manner of making and using the present invention.

A large graphical overview system providing interface to humans is deployed in one embodiment along with the Operator Station. This graphical overview system is described in U.S. Pat. No. 5,726,668 (Clement) issued on Mar. 10, 1998 and entitled "Programmable graphics panel" to John L. Clement. This patent is expressly incorporated herein by reference in the present application for showing a manner of making and using the present invention.

In a conceptualized most preferred embodiment, I/O interface 510, I/O interface 511, I/O interface 522, I/O interface 519, I/O interface 512, I/O interface 513, I/O interface 520, I/O interface 521, ring breakout 508, ring breakout 509, control computer 504, historian computer 505, ring breakout 518, ring breakout 517, control computer 506, historian computer 507, I/O interface 522, I/O interface 519, I/O interface 520, I/O interface 521, ring breakout 518, ring breakout 517, control computer 506, network support 502, network switch 501, and historian computer 507 are implemented using a dedicated context cycling computer as is described in U.S. patent application Ser. No. 08/797,967 which was filed on Feb. 12, 1997 by Wayne Dupree, Jeffery Lucas, Larry Root, Gerrit Verniers, and Stephen Churchill entitled "A Dedicated Context-Cycling Computer" with the system of 69Glaser, et. al. facilitating interface to field instrumentation. This application for patent is expressly incorporated herein by reference in the present application for showing the preferred contemplated manner of making and using the present invention.

The context cycling processor provides for a substantial number and variety of input and output circuits, with each of the specialized circuits having at least one dedicated register for retaining the process and configuration state of pertinent resources, attributes, or aspects associated with either the circuit or function while another context is active; with the combination of specialized circuit and dedicated register(s) establishing the electrical circuitry base for a context. Contexts also include affiliated logic specific for the circuitry. A plurality of contexts share common assets within the CPU.

As needed, a co-processor for use with the context cycling computer is described in U.S. Pat. No. 5,655,133 (Dupree, et. al.) issued on Aug. 5, 1997 and entitled "Massively multiplexed superscalar Harvard architecture computer" to Dupree, Wayne P.; Churchill, Stephen G.; Gallant, Jeffrey R.; Root, Larry A.; Bressette, William J.; Orr, III, Robert A.; Ramaswamy, Srikala; Lucas, Jeffrey A.; and Bleck, James. This patent is expressly incorporated herein by reference in the present application for showing the preferred contemplated manner of making and using the present invention. Network switch 501 also preferably uses a cross-bar (Xbar) switch 516 capable of implementing at least 99 parallel and simultaneous communication linkages.

The master scheduler 106 is implemented in network switch 501 to provide a common clock signal (as an access to either clock 109 or a manifestation of clock 110) and is further responsible for the distribution of the common clock signal; the collection of the requests from each of the member nodes 108, 107 (in this instance of network 530, control computer 506, historian computer 507, control computer 504, historian computer 505, user interface 503, network support 502, and network switch 501 are all instances of member nodes 107 and 108 in the data flow context of FIG. 1); the scheduling of the communication tasks for each of the member nodes 108, 107; the transmission of the schedule to each of the member nodes 108, 107; and the implementing of the connections between the member nodes 108, 107.

The purpose of distributing a common clock signal is so that each member node 108, 107 on the network 530 has the same understanding of time. This aspect of having the same understanding of time is crucial in this invention since the scheduling of tasks is done based on time. Thus, the common clock signal is used to effectively synchronize and time-align all member nodes 108, 107 to a common time. On a pre-defined periodic basis, the master scheduler 106 in network switch 501 sends a message that is propagated to each of the member nodes 108, 107 to define the beginning of a time period.

The collection of the requests from each member node 108, 107 (any one of control computer 506, historian computer 507, control computer 504, historian computer 505, user interface 503, network support 502, and network switch 501) occurs once each scheduling period. The master scheduler 106 in network switch 501 sets aside the time to receive requests from each member node 108, 107 (any one of control computer 506, historian computer 507, control computer 504, historian computer 505, user interface 503, network support 502, and network switch 501) each scheduling period. Requests originate from the member nodes 108, 107 which will need the communications requested. The master scheduler 106 in network switch 501 receives each of these requests and considers them in its scheduling logic. Each request contains information on the source, destination, and length of the communication. In addition, each request may contain a priority indicator as well as information needed to deliver its message to a particular application which is executing on the destination node. After the task of collecting the connection requests from all of the member nodes 108, 107 is completed, the result is collected into a composite request list 111. Note that it is also possible for entries in the composite request list 111 to originate inside of the master scheduler 106 in network switch 501 itself; it is also possible for particular connection requests to have a repetitive nature such that multiple connections in a set of future time periods are invoked from a single connection request.

The master scheduler 106 in network switch 501 then schedules the communications which are to occur in the future. The method which is used in order to perform the scheduling of the communications is not critical in the functioning of the time deterministic network, although the Apparent Critical Resource approach discussed in this specification is the preferred approach. Logic implements to assign times to the requested communications. The determination of when to stop the scheduling process during the scheduling period can occur in one of three ways: first, all of the communication requests which can be scheduled are scheduled and therefore, there is no more scheduling work remaining; second, there is no more time remaining in which to perform the scheduling (the processor must stop the scheduling process in order to continue on with its next task); and third, there have been more connections requested than could be scheduled in the available scheduling window of time increment (an exhaustion of bandwidth), in which case the excess requests are retained as a queue for the next scheduling attempt.

The resulting schedule is stored in a master event table 112. This master event table 112 contains the start time 621 of the scheduled communication in addition to some of the same information similar to that in the composite request list 111. Note that it is also possible that certain tasks are pre-loaded into the master event table 112 in order to bypass the scheduling process, such as is required to enforce certain timing requirements of a task.

The master scheduler 106 in network switch 501 then communicates the local event table 114, 116 (that portion of the schedule which pertains to a particular member node 107, 108) to each appropriate member node 107, 108. For each event appearing in the master event table 112 which includes an appropriate member node 108, 107 as either the source or the destination, an entry exists in the local event table 114, 116. Each member node 108, 107 (any one of control computer 506, historian computer 507, control computer 504, historian computer 505, user interface 503, network support 502, and network switch 501) which is involved in any communication receives its own local event table 114, 116.

The master scheduler 106 in network switch 501 then implements the connections according to the times which are assigned and appear in the master event table 112. The processing of these connections when using the preferred embodiment of the non-blocking switch leads to the situation whereby there may be multiple connections which are implemented concurrently.

Figure 6:
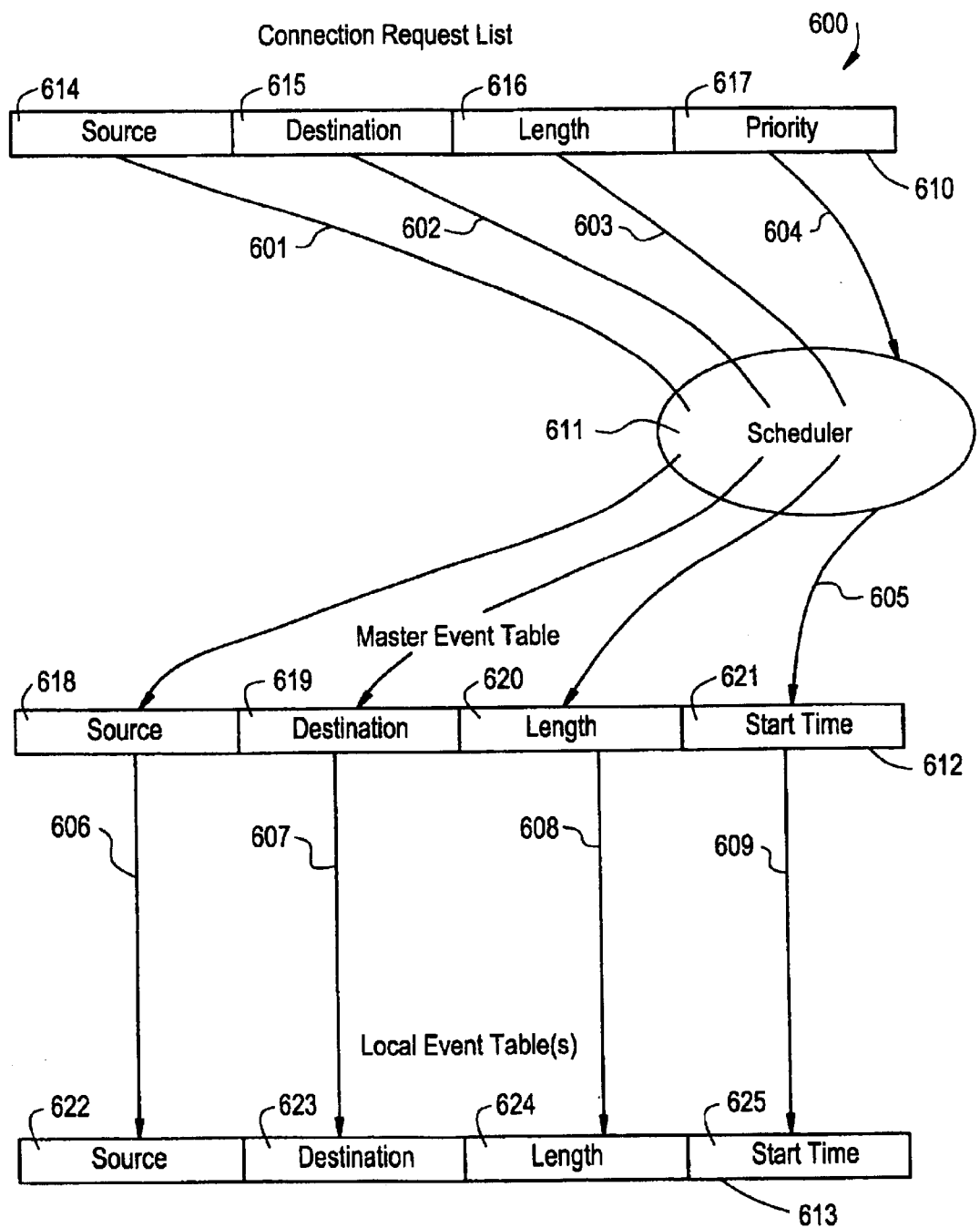
FIG. 6 presents a diagram of data structures communicated between the computing elements and a master scheduler.

The Composite Request List 111 residing in the master scheduler 106 in network switch 501 may contain both continuously repetitive connections to be implemented without contingencies, or dynamically requested connections (implemented when requested, usually initiated by one of the nodes on the network). This Connection Request List contains, at a minimum, a Source specifier, a Destination specifier, and a Duration specifier (see FIG. 6 showing record details 600). Additional parameters pertinent to scheduling optionally include such specifiers as Priority 617.

FIG. 6 shows the composition of the primary tables and messages 600 used in the scheduling and task coordination process. The connection request list 115 has Source 614, Destination 615, Length 616, and possibly Priority 617 fields 610 in both the member nodes 108, 107 and when combined into the composite request list 111 in the master scheduler 106 in network switch 501. The scheduler logic 611 in master scheduler 106 uses the data in these fields 610 to construct a schedule in the form of a master event table 112 with fields 612 for the Source 618, Destination 619, Length 620 and Start Time 621 for each of the connections. Note that the scheduler logic 611 takes the Source 614, Destination 615, and Length 616 from the connection request list 111, while the Start Time 621 is a product of the scheduling process itself.

The local event tables 114, 116 are simply subsets of the master event table 112, broken into those portions applicable to the respective member node 108, 107 (any one of control computer 506, historian computer 507, control computer 504, historian computer 505, user interface 503, network support 502, and network switch 501)—no manipulation of the fields 613 is required. Virtual paths 601, 602, 603, 606, 607, and 608 show the flow of the information from the connection request list fields 610 to the local event table fields 613. Virtual path 604 shows the input of priority 617 to the scheduler; and virtual path 609 shows the start time 621, 625 as communicated from scheduler logic 611.

This data is then used by the scheduler logic 611 to derive a schedule for servicing the requested connections. The outcome of the scheduling process of the scheduler logic 611 is recorded in the Master Event Table 112, which is in turn parsed up into respective Local Event Tables 116 for distribution to the network nodes (see FIG. 1). The Event Tables contain Source 622, Destination 623, Duration 624, and Start Time 625 fields 613.

Within the network nodes, the Local Event Tables 114, 116 are merged together with the Local Task Lists and logic executes to ensure that all the necessary work can be completed and that all timing corresponds to (or doesn't conflict with) that specified by the scheduler logic 611.

Figure 7:
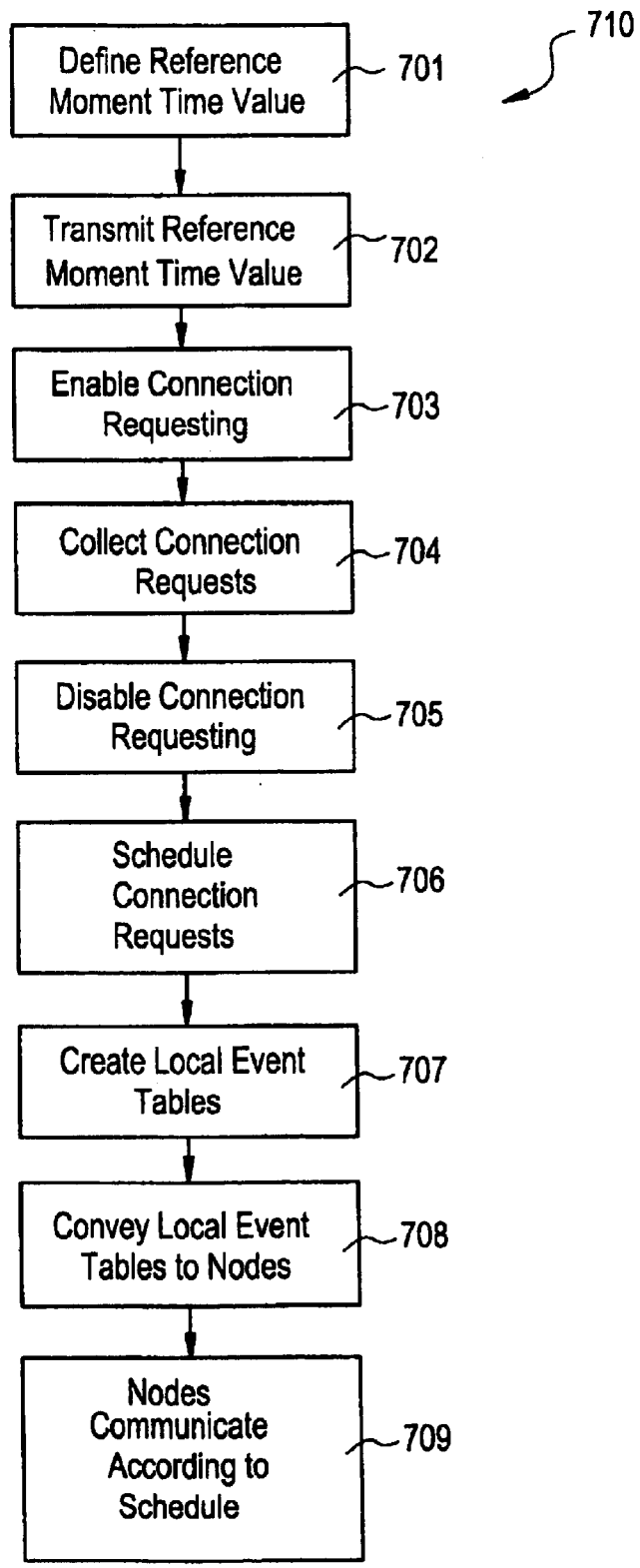
FIG. 7 depicts a flowchart of the process implemented in the master scheduler in the scheduling of communications between two separate computing elements.

FIG. 7 summarizes the general scheduling process 710. Connection requests are collected during a defined request acceptance period. After a defined period of time, the collection of connection requests must be processed. Additional connection requests are not prohibited, but a cutoff point must be established. FIG. 7 shows the basic steps involved in the master scheduler 106 in network switch 501 node which are required in scheduling the connection requests. The first three steps 701–703 provide for aligned time definition in all nodes In step 704, connection requests are received from all member nodes 107, 108 (the nodes sending their requests as a communication at predefined moments in their local task schedules from prior scheduling operations). In step 705, the connection requesting process ends so that a schedule can be defined for the future as the scheduling process applies to those requests which were collected from the member nodes 108, 107 during a particular window of time increment which is about to conclude. Schedule connections requests step 706 can begin once the requests have been collected (more detail in FIG. 8). Once the schedule is complete, the applicable portions of the schedule are extracted from the master event table 112 in the creation of the local event tables 114, 116, in step 707 which are then conveyed to the nodes 107, 108 in step 708 for later implementation in step 709.

For distributed computing environments in general, connections between nodes 107, 108 may be required at any time, meaning that connection requests may originate any time, and some service time must be tolerable in handling the connections. There are four processes, then, that repetitively execute at a rate conformant to the desired response in the network 530: collecting connection requests, scheduling connection requests, distributing the resulting schedule to the network nodes, and communicating through the network 530 via the established requested connections (see Table 1).

TABLE 1

Four Scheduling Steps

Request
Schedule
Convey Schedule
Communicate

Table 2 shows the timing relationship between these four processes which, as stated, are always in progress.

TABLE 2

The Scheduling Pipeline

| | | |
|---|---|---|
| Request Connections | | |
| Request Connections | Schedule Connections | |
| Request Connections | Schedule Connections | Convey Schedule A |

TABLE 2-continued

The Scheduling Pipeline

| Request Connections | Schedule Connections | Convey Schedule B | Communicate A |
| Request Connections | Schedule Connections | Convey Schedule C | Communicate B |
| Request Connections | Schedule Connections | Convey Schedule D | Communicate C |
| Request Connections | Schedule Connections | Convey Schedule E | Communicate D |
| Request Connections | Schedule Connections | Convey Schedule F | Communicate E |

Note in the rightmost column of Table 2 that communications are always taking place after an initial few iterations establish a basis for communications. For any particular communications in a window of time increment, the schedule for the communications being implemented was conveyed in a previous window of time increment, the requests were scheduled in a window of time increment prior to the conveyance of the schedule, and the requests were requested even prior to scheduling. Timing variations can exist in this pipeline, but this resembles the pipeline used in the preferred embodiment.

The logic used in the currently preferred embodiment has been designed with two objectives in mind: an efficient schedule must be the outcome, and the number of cycles required to generate that schedule must be bounded at a reasonable level. Efficient scheduling involves a simple process based on the premise that the efficiency of the resultant schedule is primarily a function of the efficiency to which the busiest resources have been utilized in the schedule. This amounts to making sure that, at all times in the scheduling process, scheduling precedence is given to the resources with the highest remaining demands. In order to derive a schedule in an acceptable amount of time, the logic was designed to schedule each request once and only once (trial and error logics deemed unacceptable), and with a moderate handling requirement for each connection request.

Figure 8:
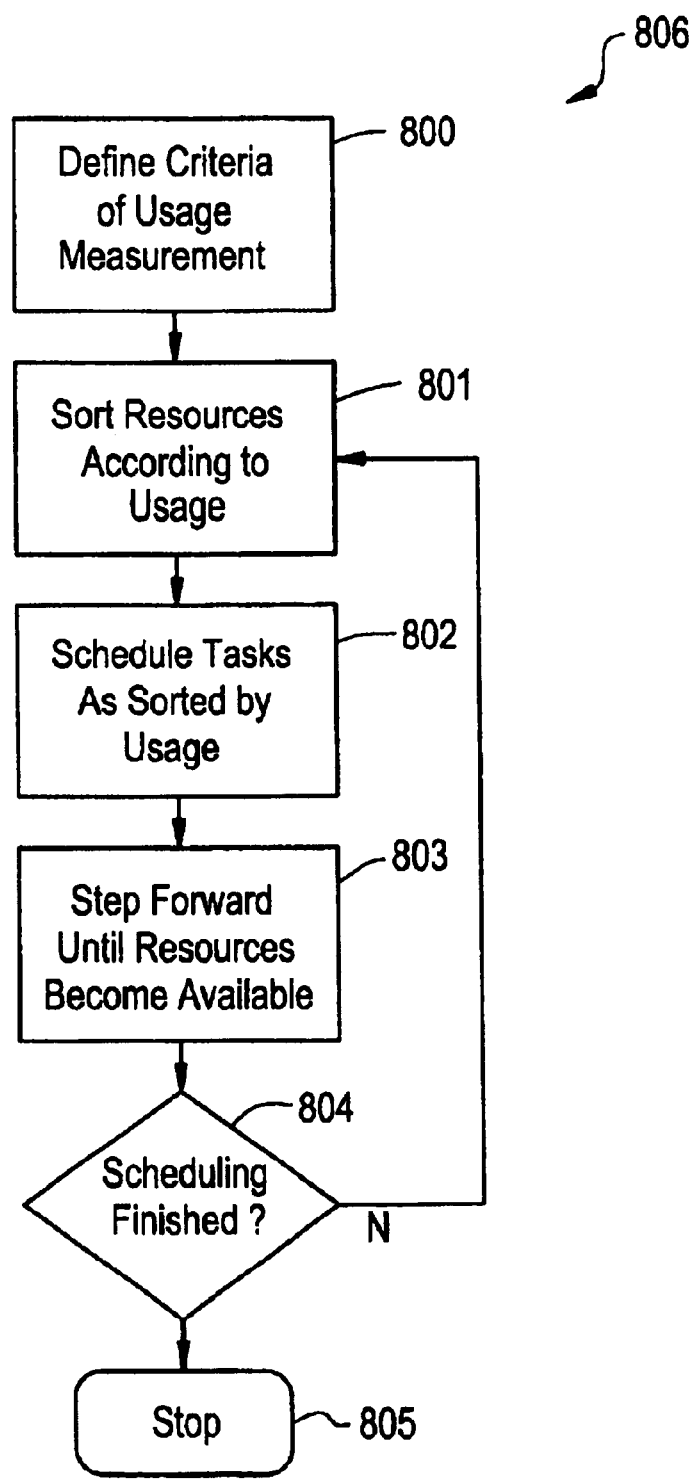
FIG. 8 presents a simplified diagram of the scheduling logic (software in execution by electrical circuitry) implemented in the master scheduler in the scheduling of communications between two separate computing elements.

The basic process in scheduling 806, as shown in FIG. 8, is to 1) define a criteria for measuring resource demand;
2) sort the resources according to criticality;
3) service those connections which can be serviced in this step and in the order of resource criticality;
4) step forward to the completion of the previously serviced requests thereby freeing up the applicable resources;
5) repeat steps 2–4 until all requests have been serviced or until there's no opportunity to service more requests.

Any requests which weren't able to be serviced in this scheduling pass can then be resubmitted during the next scheduling pass.

The flowchart of FIG. 8 outlines the process used in the Apparent Critical Resource scheduling logic. The first step is to define the criteria by which resource usage is to be measured 800. For the preferred embodiment, transmit and receive channels are the resources which are scheduled, and the usage duration for each of these resources is the criteria chosen.

Once the resources are evaluated for usage, they are sorted by usage 801. This allows the resources which are used most heavily to be scheduled in step 802 first. When all resources which can be scheduled have been scheduled (the existing requested connections may not require or permit the simultaneous use of all resources), the scheduling window of time increment is advanced in step 803 until applicable resources become available. If there are more connection requests to be serviced and more time in the schedule to service these requests, this process is repeated after step 804 resolves the question respective to the need for another iteration through steps 801 to 803). The sub process 806 of the scheduler logic proceeds to step 805 to exit upon resolution by step 804 that the scheduling instance has been completed.

Figure 9:
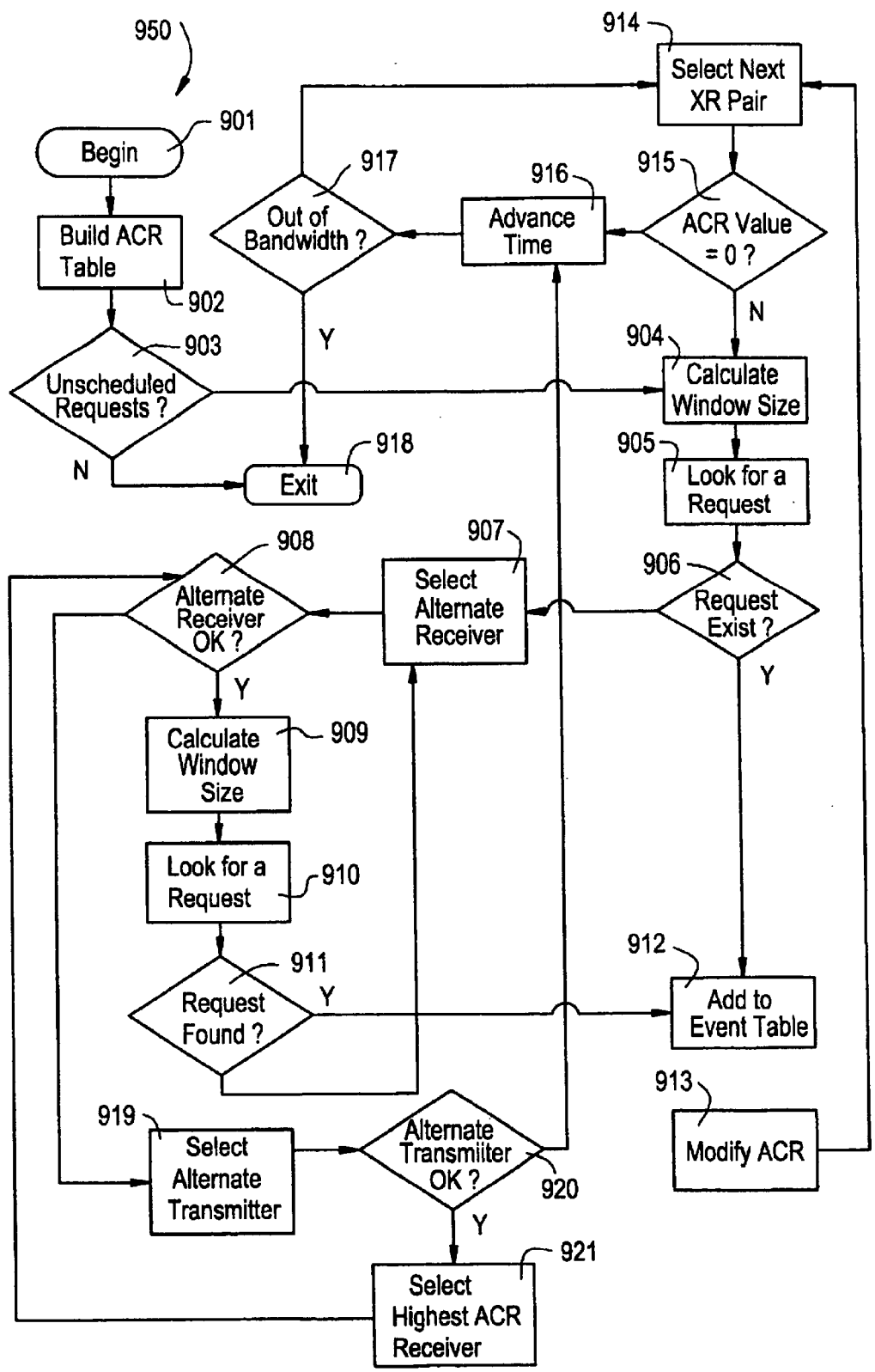
FIG. 9 presents a detailed flowchart of the scheduling logic which is followed at the master scheduler.

FIG. 9 presents a more detailed overview of the Apparent Critical Resource (ACR) preferred embodiment sub-process 950 of the scheduling logic. This diagram encompasses the steps mentioned in FIG. 8 and some additional actions required for conditional operation and exception handling as the preferred implementation of the process shown in FIG. 8. Step 901 represents the initiation point for the preferred ACR process. In step 902, the ACR table is constructed, and a determination is made in step 903 respecting the presence of unscheduled requests based on the values of the SAV in the ACR table (a rapid exit to step 918 is executed if the values indicates that no requests are in the ACR table). If requests exist, the ACR sub-process 950 proceeds to calculate window size in step 904, look for a specific request in step 905, and check on the existence of the specific request and parties for the communication in step 906. If the request and parties exist, the process proceeds to add the event to the event table in step 912 and modify the ACR path in step 913 before proceeding to the next request in step 914. If the high value is not zero in step 915, the process proceeds again to step 904. If the high value is zero in step 915, the definition of (future) time in the ACR is advanced in step 916, the bandwidth is checked in step 917 for sufficiency in time to enable further scheduling in this scheduling operation, and the process returns to step 914 for the next request. If in step 906, a receiver for the communication did not exist, an alternative receiver is defined in step 907 and evaluated in step 908. If step 908 does not define an alternative receiver, an alternative transmitter is selected in step 919 and evaluated in step 920; if acceptable (step 920), step 921 selects the receiver with the highest ACR value and returns the process to step 908; and, if not acceptable (step 920), the process advances to step 916. When an alternative is defined in step 908, the process proceeds to schedule via steps 909, 910 and 911 to step 912. The virtual datalogical process being executed by these steps can be best described by considering an example respective to the list of communication requests for a hypothetical network consisting of five nodes shown in Table 3:

TABLE 3

Initial Request List

| Source | Destination | Length | Priority |
|--------|-------------|--------|----------|
| 1 | 2 | 15 | 1 |
| 1 | 4 | 23 | 1 |
| 1 | 5 | 2 | 1 |
| 2 | 1 | 24 | 1 |
| 3 | 1 | 16 | 1 |
| 3 | 1 | 12 | 1 |
| 3 | 2 | 20 | 1 |
| 3 | 3 | 8 | 1 |
| 3 | 4 | 19 | 1 |
| 3 | 4 | 16 | 1 |

TABLE 3-continued

Initial Request List

| Source | Destination | Length | Priority |
|---|---|---|---|
| 3 | 5 | 4 | 1 |
| 3 | 5 | 9 | 1 |
| 4 | 1 | 13 | 1 |
| 4 | 5 | 9 | 1 |
| 5 | 1 | 21 | 1 |
| 5 | 1 | 8 | 1 |
| 5 | 2 | 8 | 1 |
| 5 | 3 | 1 | 1 |
| 5 | 4 | 18 | 1 |
| Total | | 246 | |

Assume that the length is measured in some arbitrary units of time, perhaps in milliseconds, and that there are n different priority levels, 1 through n, where 1 is the most urgent and n is the least.

First, note that with a broadcast type network (where all transactions are required to share the bandwidth, such as a Carrier Sense Multiple Access with Collision Detection or CSMA/CD network), service time required to complete the above requests would require a theoretical minimum of 246 units of time.

The incorporation of a non-blocking switch permits the simultaneous operation of the 5 transmit resources and the 5 receive resources. In analyzing the benefit of implementing a non-blocking network, the scheduler logic of the example first assesses the demands on each of the resources by constructing a table such as Table 4:

TABLE 4

Initial Summed Access Values

| X/R | 1 | 2 | 3 | 4 | 5 | SAV |
|---|---|---|---|---|---|---|
| 1 | — | 15 | — | 23 | 2 | 40 |
| 2 | 24 | — | — | — | — | 24 |
| 3 | 28 | 20 | 8 | 35 | 13 | 104 |
| 4 | 13 | — | — | — | 9 | 22 |
| 5 | 29 | 8 | 1 | 18 | — | 56 |
| SAV | 94 | 43 | 9 | 76 | 24 | 246 |

The summed access values, or SAVs, are simply the row or column totals for the transmitter (X—in the rows of the table) and receiver (R—in the columns of the table) interaction times and reflect the total demands on the particular resource, as measured in the arbitrary units of length. Note now that the theoretical minimum time required to service the requests has dropped from 246 units of time to 104 by selecting a non-blocking switch solution. The minimum service time for these requests is probably constrained by transmitter 3 since transmitter 3 has the highest SAV and the other transmitters can typically be serviced while transmitter 3 is being serviced. While the theoretical lower limit may be 104 units of time, the actual minimum service time may be greater and may even be dependent upon the order in which the connections are serviced. The next objective, however, is determining the optimum scheduling method in order to maximize the capabilities of the existing network (minimizing the required service time).

Assume for this particular example that the resultant schedule, regardless of the number or composition of the requests, applies to a future window of time increment of time with a duration of 150 units of time. The example begin by looking at the connections to be made at Time=0 for that 150 unit schedule. The primary objective, judging by the SAVs, is to schedule some request involving Transmitter 3 and Receiver 1. Referring back to the initial Request List, the scheduler logic of the example finds a request involving Transmitter 3 and Receiver 1 which has a length of 16 units of time. Since the scheduler logic of the example is currently scheduling connections at Time=0 and the scheduler logic of the example has 150 units of time, the scheduler logic of the example concludes that the 16 word request fits into the scheduling window of time increment, and records the transaction into the Event Table of Table 5.

TABLE 5

Intermediate Event Table

| Source | Destination | Length | Priority | Start Time |
|---|---|---|---|---|
| 3 | 1 | 16 | 1 | 0 |
| — | — | — | — | — |
| — | — | — | — | — |
| — | — | — | — | — |
| — | — | — | — | — |
| — | — | — | — | — |
| — | — | — | — | — |
| — | — | — | — | — |
| — | — | — | — | — |
| — | — | — | — | — |
| — | — | — | — | — |
| — | — | — | — | — |
| — | — | — | — | — |
| — | — | — | — | — |
| — | — | — | — | — |
| — | — | — | — | — |
| — | — | — | — | — |
| — | — | — | — | — |

Figure 10:
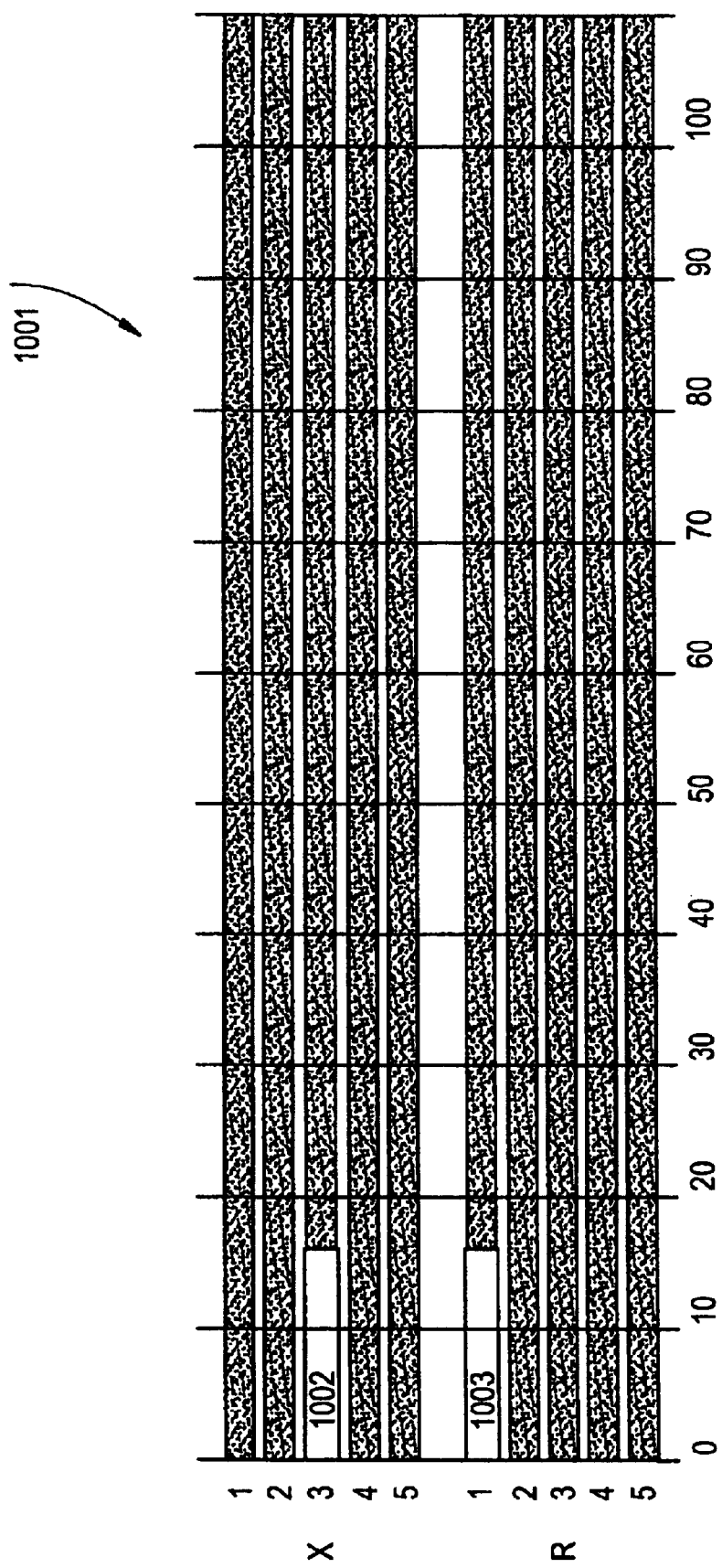
FIG. 10 presents a bar chart depicting the first scheduled communications between two separate computing elements after the first connection is scheduled.

Pictorially, Table 5 may be shown as schedule chart 1001 in FIG. 10. Transmitter scheduled element 1002 and receiver scheduled element 1003 denote the scheduled tasks.

The Request List must then somehow reflect the fact that this last request has been serviced. This modified Request List may now resemble that shown in Table 6.

TABLE 6

Intermediate Request List

| Source | Destination | Length | Priority | Start Time |
|---|---|---|---|---|
| 1 | 2 | 15 | 1 | — |
| 1 | 4 | 23 | 1 | — |
| 1 | 5 | 2 | 1 | — |
| 2 | 1 | 24 | 1 | — |
| 3 | 1 | 16 | 1 | 0 |
| 3 | 1 | 12 | 1 | — |
| 3 | 2 | 20 | 1 | — |
| 3 | 3 | 8 | 1 | — |
| 3 | 4 | 19 | 1 | — |
| 3 | 4 | 16 | 1 | — |
| 3 | 5 | 4 | 1 | — |
| 3 | 5 | 9 | 1 | — |
| 4 | 1 | 13 | 1 | — |
| 4 | 5 | 9 | 1 | — |
| 5 | 1 | 21 | 1 | — |
| 5 | 1 | 8 | 1 | — |
| 5 | 2 | 8 | 1 | — |
| 5 | 3 | 1 | 1 | — |
| 5 | 4 | 18 | 1 | — |
| Total | | 246 | | |

Since Transmitter 3 and Receiver 1 are now busy for Time=0, their status must indicate this, so the updated SAV Table, following some reformatting, may now resemble Table 7:

TABLE 7

Intermediate Summed Access Value Table

| Channel | Transmitter SAV | Receiver SAV |
|---|---|---|
| 1 | 40 | 78 |
| 2 | 24 | 43 |
| 3 | 88 | 9 |
| 4 | 22 | 76 |
| 5 | 56 | 24 |

Note that the SAVs for Transmitter 3 and Receiver 1 have been adjusted to reflect the serviced request. This is because the scheduler logic continues to give scheduling precedence to the resources with the highest impact on the schedule. This happens at the expense of the other resource needs, and at some point the inefficiencies injected into the resources with low SAVs may cause those resources to have a higher impact on the remaining portion of the schedule than those resources which had the highest impact at the start. For this reason, the protocol is referred to as Apparent Critical Resource scheduling (scheduling precedence is always given to resources which appear to be on the critical path at the time of consideration), or ACR scheduling.

It is now evident that the scheduler logic of the example should try to schedule a request from Transmitter 5 to Receiver 4, the next two concurrent resources in regards to scheduling impact which remain available for scheduling. There is such a request, so the scheduler logic of the example executes so that the tables now resemble Tables 8, 9, and 10.

TABLE 8

Intermediate Request List

| Source | Destination | Length | Priority | Start Time |
|---|---|---|---|---|
| 1 | 2 | 15 | 1 | — |
| 1 | 4 | 23 | 1 | — |
| 1 | 5 | 2 | 1 | — |
| 2 | 1 | 24 | 1 | — |
| 3 | 1 | 16 | 1 | 0 |
| 3 | 1 | 12 | 1 | — |
| 3 | 2 | 20 | 1 | — |
| 3 | 3 | 8 | 1 | — |
| 3 | 4 | 19 | 1 | — |
| 3 | 4 | 16 | 1 | — |
| 3 | 5 | 4 | 1 | — |
| 3 | 5 | 9 | 1 | — |
| 4 | 1 | 13 | 1 | — |
| 4 | 5 | 9 | 1 | — |
| 5 | 1 | 21 | 1 | — |
| 5 | 1 | 8 | 1 | — |
| 5 | 2 | 8 | 1 | — |
| 5 | 3 | 1 | 1 | — |
| 5 | 4 | 18 | 1 | 0 |
| Total | | 246 | | |

TABLE 9

Intermediate Event Table

| Source | Destination | Length | Priority | Start Time |
|---|---|---|---|---|
| 3 | 1 | 16 | 1 | 0 |
| 5 | 4 | 18 | 1 | 0 |
| — | — | — | — | — |
| — | — | — | — | — |
| — | — | — | — | — |
| — | — | — | — | — |

TABLE 9-continued

Intermediate Event Table

| Source | Destination | Length | Priority | Start Time |
|---|---|---|---|---|
| — | — | — | — | — |
| — | — | — | — | — |
| — | — | — | — | — |
| — | — | — | — | — |
| — | — | — | — | — |
| — | — | — | — | — |
| — | — | — | — | — |
| — | — | — | — | — |
| — | — | — | — | — |
| — | — | — | — | — |
| — | — | — | — | — |
| — | — | — | — | — |
| — | — | — | — | — |

TABLE 10

Intermediate Summed Access Value Table

| Channel | Transmitter SAV | Receiver SAV |
|---|---|---|
| 1 | 40 | 78 |
| 2 | 24 | 43 |
| 3 | 88 | 9 |
| 4 | 22 | 58 |
| 5 | 38 | 24 |

Note that the Event Table is effectively a (chronologically) sorted list of the scheduled requests from the Request List. For this reason, intermediate stages are not shown for each scheduling step.

Repeating the process as before, the scheduler logic of the example schedules a 1-to-2 communication instance request (i.e. a connection from Transmitter 1 to Receiver 2), and the tables are modified to Tables 11 and 12 as follows:

TABLE 11

Intermediate Request List

| Source | Destination | Length | Priority | Start Time |
|---|---|---|---|---|
| 1 | 2 | 15 | 1 | 0 |
| 1 | 4 | 23 | 1 | — |
| 1 | 5 | 2 | 1 | — |
| 2 | 1 | 24 | 1 | — |
| 3 | 1 | 16 | 1 | 0 |
| 3 | 1 | 12 | 1 | — |
| 3 | 2 | 20 | 1 | — |
| 3 | 3 | 8 | 1 | — |
| 3 | 4 | 19 | 1 | — |
| 3 | 4 | 16 | 1 | — |
| 3 | 5 | 4 | 1 | — |
| 3 | 5 | 9 | 1 | — |
| 4 | 1 | 13 | 1 | — |
| 4 | 5 | 9 | 1 | — |
| 5 | 1 | 21 | 1 | — |
| 5 | 1 | 8 | 1 | — |
| 5 | 2 | 8 | 1 | — |
| 5 | 3 | 1 | 1 | — |
| 5 | 4 | 18 | 1 | 0 |
| Total | | 246 | | |

TABLE 12

Intermediate Summed Access Value Table

| Channel | Transmitter SAV | Receiver SAV |
|---|---|---|
| 1 | 25 | 78 |
| 2 | 24 | 28 |
| 3 | 88 | 9 |
| 4 | 22 | 58 |
| 5 | 38 | 24 |

The scheduler logic of the example next looks for a 2-to-5 communication instance request, but such a request was not made. Several alternatives exist in determining the next combination to be attempted, and the optimum solution is chosen based on the desired tradeoffs between bandwidth efficiency and processing costs. (With minimal bandwidth impact, a simple rule set can be chosen, and for the preferred embodiment, an alternative receiver is selected for the existing transmitter until all receiver choices have been exhausted, after which that particular transmitter is ignored and the next transmitter is selected, and the highest impact receiver is reconsidered—see FIG. 9.)

Using this logic, a 2 to 3 communication instance request is searched for but not found, then a 4 to 5 communication instance request is searched for, found, and selected. The SAV Table is updated, and it is determined that no other connections can be made at Time=0. The Event Table now is shown in Table 13:

TABLE 13

Intermediate Event Table

| Source | Destination | Length | Priority | Start Time |
|---|---|---|---|---|
| 3 | 1 | 16 | 1 | 0 |
| 5 | 4 | 18 | 1 | 0 |
| 1 | 2 | 15 | 1 | 0 |
| 4 | 5 | 9 | 1 | 0 |
| — | — | — | — | — |
| — | — | — | — | — |
| — | — | — | — | — |
| — | — | — | — | — |
| — | — | — | — | — |
| — | — | — | — | — |
| — | — | — | — | — |
| — | — | — | — | — |
| — | — | — | — | — |
| — | — | — | — | — |
| — | — | — | — | — |
| — | — | — | — | — |

Figure 11:
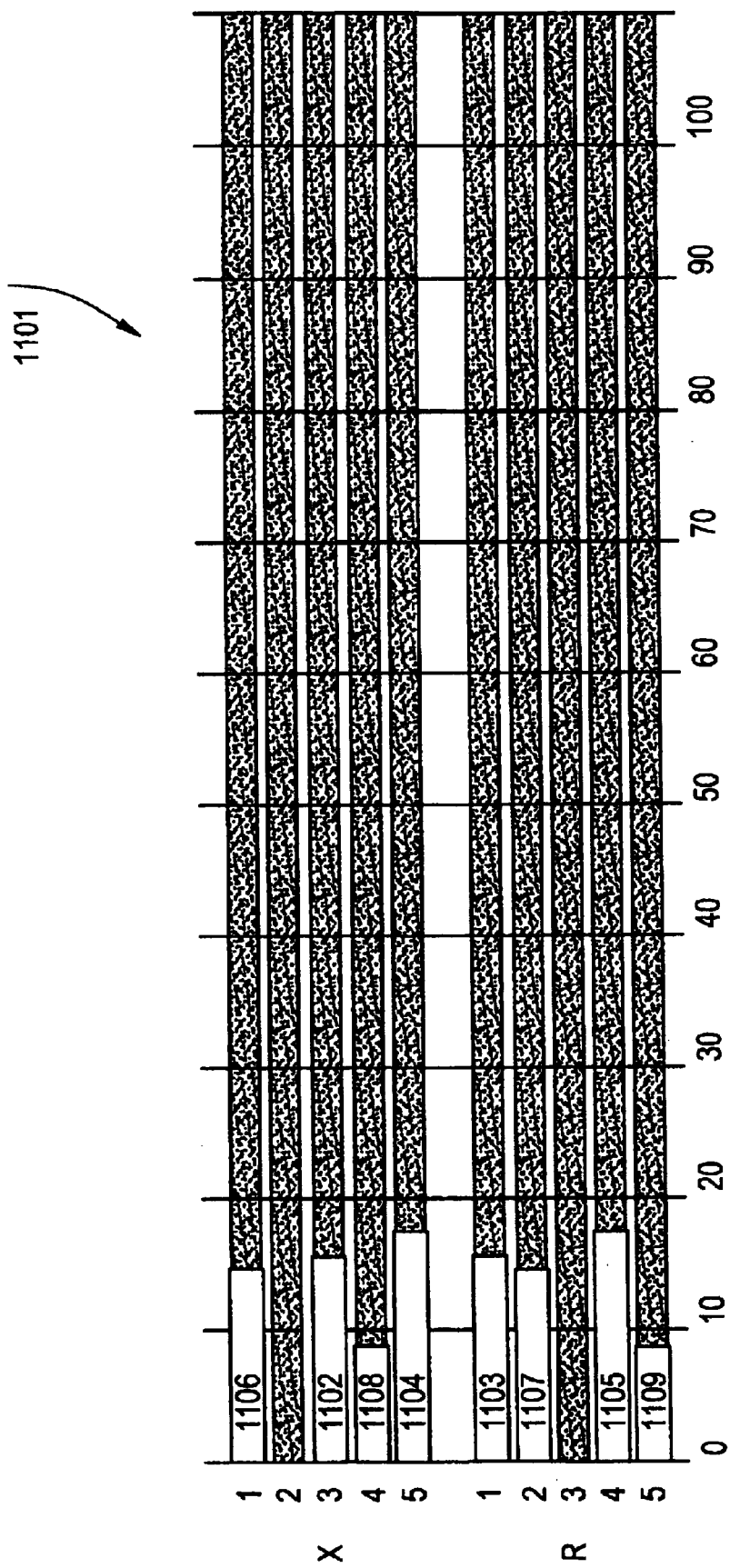
FIG. 11 presents a bar chart depicting the scheduled communications between computing elements after all connections are scheduled which can be scheduled in the first step.

Again, these four connections can be represented pictorially in schedule chart 1101 in FIG. 11. Transmitter scheduled element 1002 and receiver scheduled element 1003 from FIG. 10 have been denoted as scheduled elements 1102 and 1103, respectively, and have been joined by scheduled elements 1104 and 1105 (the 5-to-4 communication), 1106 and 1107 (the 1-to-2 communication), and 1108 and 1109 (the 4-to-5 communication).

The logic involved in Advancing Time amounts to advancing to the next chronological finish. In this case, the 4 to 5 communication instance connection is the next chronological finish, so the example advances time to Time=9, at which time Transmitter 4 and Receiver 5 are again enabled. The Request List and SAV Table are now as shown in Tables 14 and 15.

TABLE 14

Intermediate Request List

| Source | Destination | Length | Priority | Start Time |
|---|---|---|---|---|
| 1 | 2 | 15 | 1 | 0 |
| 1 | 4 | 23 | 1 | — |
| 1 | 5 | 2 | 1 | — |
| 2 | 1 | 24 | 1 | — |
| 3 | 1 | 16 | 1 | 0 |
| 3 | 1 | 12 | 1 | — |
| 3 | 2 | 20 | 1 | — |
| 3 | 3 | 8 | 1 | — |
| 3 | 4 | 19 | 1 | — |
| 3 | 4 | 16 | 1 | — |
| 3 | 5 | 4 | 1 | — |
| 3 | 5 | 9 | 1 | — |
| 4 | 1 | 13 | 1 | — |
| 4 | 5 | 9 | 1 | 0 |
| 5 | 1 | 21 | 1 | — |
| 5 | 1 | 8 | 1 | — |
| 5 | 2 | 8 | 1 | — |
| 5 | 3 | 1 | 1 | — |
| 5 | 4 | 18 | 1 | 0 |
| Total | | 246 | | |

TABLE 15

Intermediate Summed Access Value Table

| Channel | Transmitter SAV | Receiver SAV |
|---|---|---|
| 1 | 25 | 78 |
| 2 | 24 | 28 |
| 3 | 88 | 9 |
| 4 | 13 | 58 |
| 5 | 38 | 15 |

After searches for a 2-to-5 communication instance request, a 2-to-3 communication instance request, a 4-to-5 communication instance request and a 4-to-3 communication instance request, the scheduler logic of the example concludes that the example must again advance time—nothing could actually be scheduled at Time=9. Now, the next finish is at Time=15, at which time the 1-to-2 communication instance connection finishes and the SAV Table is now Table 16.

TABLE 16

Intermediate Summed Access Value Table

| Channel | Transmitter SAV | Receiver SAV |
|---|---|---|
| 1 | 25 | 78 |
| 2 | 24 | 28 |
| 3 | 88 | 9 |
| 4 | 13 | 58 |
| 5 | 38 | 15 |

The scheduler logic of the example now looks for a 1-to-2 communication instance request, but the only 1-to-2 communication instance has already been scheduled, so the example look for a 1-to-5 communication instance request, which the example finds and schedules. The new SAV Table is then Table 17.

TABLE 17

Intermediate Summed Access Value Table

| Channel | Transmitter SAV | Receiver SAV |
|---|---|---|
| 1 | 23 | 78 |
| 2 | 24 | 28 |
| 3 | 88 | 9 |
| 4 | 13 | 58 |
| 5 | 38 | 13 |

The scheduler logic of the example then looks for a 2-to-2 communication instance request, a 2-to-3 communication instance request, a 4-to-2 communication instance request and a 4-to-3 communication instance request before determining that it's time again to advance time. The example advances time from 15 to 16, at which time the SAV Table looks like Table 18.

TABLE 18

Intermediate Summed Access Value Table

| Channel | Transmitter SAV | Receiver SAV |
|---|---|---|
| 1 | 23 | 78 |
| 2 | 24 | 28 |
| 3 | 88 | 9 |
| 4 | 13 | 58 |
| 5 | 38 | 13 |

The scheduler logic of the example then schedules a 3-to-1 communication instance request, which turns out to be the only request which can be scheduled at Time=16. The tables, after the scheduler logic of the example advances time to Time=17, look like Tables 19, 20, and 21.

TABLE 19

Intermediate Summed Access Value Table

| Channel | Transmitter SAV | Receiver SAV |
|---|---|---|
| 1 | 23 | 66 |
| 2 | 24 | 28 |
| 3 | 76 | 9 |
| 4 | 13 | 58 |
| 5 | 38 | 13 |

TABLE 20

Intermediate Request List

| Source | Destination | Length | Priority | Start Time |
|---|---|---|---|---|
| 1 | 2 | 15 | 1 | 0 |
| 1 | 4 | 23 | 1 | — |
| 1 | 5 | 2 | 1 | 15 |
| 2 | 1 | 24 | 1 | — |
| 3 | 1 | 16 | 1 | 0 |
| 3 | 1 | 12 | 1 | 16 |
| 3 | 2 | 20 | 1 | — |
| 3 | 3 | 8 | 1 | — |
| 3 | 4 | 19 | 1 | — |
| 3 | 4 | 16 | 1 | — |
| 3 | 5 | 4 | 1 | — |
| 3 | 5 | 9 | 1 | — |
| 4 | 1 | 13 | 1 | — |
| 4 | 5 | 9 | 1 | 0 |
| 5 | 1 | 21 | 1 | — |
| 5 | 1 | 8 | 1 | — |
| 5 | 2 | 8 | 1 | — |

TABLE 20-continued

Intermediate Request List

| Source | Destination | Length | Priority | Start Time |
|---|---|---|---|---|
| 5 | 3 | 1 | 1 | — |
| 5 | 4 | 18 | 1 | 0 |
| Total | | 246 | | |

Nothing can be scheduled at Time=17, so the example advance to Time=18 where the 5-to-4 communication instance request finishes up.

TABLE 21

Intermediate Summed Access Value Table

| Channel | Transmitter SAV | Receiver SAV |
|---|---|---|
| 1 | 23 | 66 |
| 2 | 24 | 28 |
| 3 | 76 | 9 |
| 4 | 13 | 58 |
| 5 | 38 | 13 |

After unsuccessfully searching for a 5-to-4 communication instance request, a 5-to-2 communication instance request is found, a 1-to-4 communication instance request is found, and the tables now look like Tables 22 and 23:

TABLE 22

Intermediate Summed Access Value Table

| Channel | Transmitter SAV | Receiver SAV |
|---|---|---|
| 1 | — | 66 |
| 2 | 24 | 20 |
| 3 | 76 | 9 |
| 4 | 13 | 35 |
| 5 | 30 | 13 |

TABLE 23

Intermediate Request List

| Source | Destination | Length | Priority | Start Time |
|---|---|---|---|---|
| 1 | 2 | 15 | 1 | 0 |
| 1 | 4 | 23 | 1 | 18 |
| 1 | 5 | 2 | 1 | 15 |
| 2 | 1 | 24 | 1 | — |
| 3 | 1 | 16 | 1 | 0 |
| 3 | 1 | 12 | 1 | 16 |
| 3 | 2 | 20 | 1 | — |
| 3 | 3 | 8 | 1 | — |
| 3 | 4 | 19 | 1 | — |
| 3 | 4 | 16 | 1 | — |
| 3 | 5 | 4 | 1 | — |
| 3 | 5 | 9 | 1 | — |
| 4 | 1 | 13 | 1 | — |
| 4 | 5 | 9 | 1 | 0 |
| 5 | 1 | 21 | 1 | — |
| 5 | 1 | 8 | 1 | — |
| 5 | 2 | 8 | 1 | 18 |
| 5 | 3 | 1 | 1 | — |
| 5 | 4 | 18 | 1 | 0 |
| Total | | 246 | | |

The scheduler logic of the example now advances time to Time=26 for which the scheduler logic of the example defines Table 24:

TABLE 24

Intermediate Summed Access Value Table

| Channel | Transmitter SAV | Receiver SAV |
|---|---|---|
| 1 | — | 66 |
| 2 | 24 | 20 |
| 3 | 76 | 9 |
| 4 | 13 | 35 |
| 5 | 30 | 13 |

The scheduler logic of the example now schedules a 5-to-3 communication instance, which is all that can be scheduled at this time. Time is then advanced to 27, then to 28, and the SAV Table looks like Table 25.

TABLE 25

Intermediate Summed Access Value Table

| Channel | Transmitter SAV | Receiver SAV |
|---|---|---|
| 1 | — | 66 |
| 2 | 24 | 20 |
| 3 | 76 | 8 |
| 4 | 13 | 35 |
| 5 | 29 | 13 |

Since there are no 3-to-1 communication instance requests, the scheduler logic of the example schedules a 3-to-2 communication instance request and a 5-to-1 communication instance request, and advances time to 31 and then to 48, at which time the SAV Table becomes Table 26.

TABLE 26

Intermediate Summed Access Value Table

| Channel | Transmitter SAV | Receiver SAV |
|---|---|---|
| 1 | — | 45 |
| 2 | 24 | — |
| 3 | 37 | 8 |
| 4 | 13 | 16 |
| 5 | 8 | 13 |

The scheduler logic of the example then schedules the 3-to-4 communication instance request and advances time to 49, giving Table 27 as a result.

TABLE 27

Intermediate Summed Access Value Table

| Channel | Transmitter SAV | Receiver SAV |
|---|---|---|
| 1 | — | 45 |
| 2 | 24 | — |
| 3 | 37 | 8 |
| 4 | 13 | 16 |
| 5 | 8 | 13 |

The scheduler logic of the example then books a 2-to-1 communication instance request and advances time to 67, giving Table 28.

TABLE 28

Intermediate Summed Access Value Table

| Channel | Transmitter SAV | Receiver SAV |
|---|---|---|
| 1 | — | 21 |
| 2 | — | — |
| 3 | 29 | 8 |
| 4 | 13 | 16 |
| 5 | 8 | 13 |

The scheduler logic of the example now books the 3-to-3 communication instance request and advances time to 73 as shown in Table 29.

TABLE 29

Intermediate Summed Access Value Table

| Channel | Transmitter SAV | Receiver SAV |
|---|---|---|
| 1 | — | 21 |
| 2 | — | — |
| 3 | 29 | — |
| 4 | 13 | 16 |
| 5 | 8 | 13 |

The scheduler logic of the example then books the 4-to-1 communication instance request, and advances time to 75, resulting in Table 30.

TABLE 30

Intermediate Summed Access Value Table

| Channel | Transmitter SAV | Receiver SAV |
|---|---|---|
| 1 | — | 8 |
| 2 | — | — |
| 3 | 29 | — |
| 4 | — | 16 |
| 5 | 8 | 13 |

This allows the remaining 3-to-4 communication instance request to be scheduled by the scheduler logic of the example, after which the scheduler logic of the example advances to Time=86, resulting in Table 31 data.

TABLE 31

Intermediate Summed Access Value Table

| Channel | Transmitter SAV | Receiver SAV |
|---|---|---|
| 1 | — | 8 |
| 2 | — | — |
| 3 | 13 | — |
| 4 | — | — |
| 5 | 8 | 13 |

The scheduler logic of the example now schedules the remaining 5-to-1 communication instance request, advances time to 91, schedules the first 3-to-5 communication instance request, advances time to 94, then to 95, and schedules the final request, another 3-to-5 communication instance request. The resultant Event Table then looks like Table 32.

TABLE 32

Final Event Table

| Source | Destination | Length | Priority | Start Time |
|---|---|---|---|---|
| 3 | 1 | 16 | 1 | 0 |
| 5 | 4 | 18 | 1 | 0 |
| 1 | 2 | 15 | 1 | 0 |
| 4 | 5 | 9 | 1 | 0 |
| 1 | 5 | 2 | 1 | 15 |
| 3 | 1 | 12 | 1 | 16 |
| 5 | 2 | 8 | 1 | 18 |
| 1 | 4 | 23 | 1 | 18 |
| 5 | 3 | 1 | 1 | 26 |
| 3 | 2 | 20 | 1 | 28 |
| 5 | 1 | 21 | 1 | 28 |
| 3 | 4 | 19 | 1 | 48 |
| 2 | 1 | 24 | 1 | 49 |
| 3 | 3 | 8 | 1 | 67 |
| 4 | 1 | 13 | 1 | 73 |
| 3 | 4 | 16 | 1 | 75 |
| 5 | 1 | 8 | 1 | 86 |
| 3 | 5 | 4 | 1 | 91 |
| 3 | 5 | 9 | 1 | 95 |

Note that the entire list of request completes in 104 units of time—the theoretical minimum amount of time required to service these particular requests.

Figure 12:
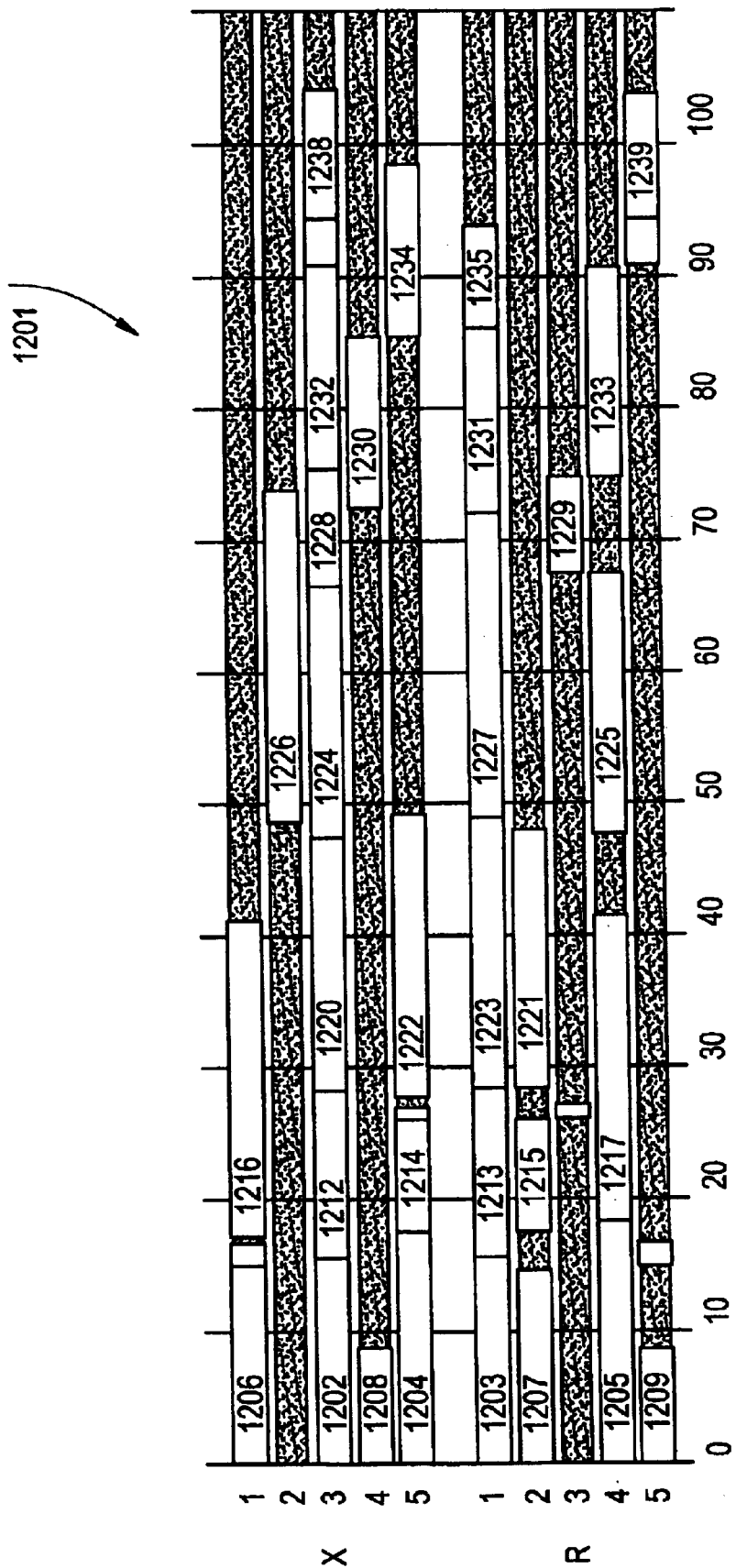
FIG. 12 presents a bar chart depicting the scheduled communications between computing elements after all connections have been scheduled.

Pictorially, the final schedule is shown in as schedule chart 1201 in FIG. 12. Transmitter scheduled element 1002 and receiver scheduled element 1003 from FIG. 10 have been denoted as scheduled elements 1202 and 1203; scheduled elements 1104 and 1105, 1106 and 1107, and 1108 and 1109 from FIG. 11 are denoted as scheduled elements 1204, 1205, 1206, 1207,1208, and 1209; and new elements 1216–1217 for the 1-to-4 communication instance, 1214–1215 for the 5-to-2 communication instance, 1212–1213 for the 3-to-1 communication instance, 1220–1221 for the 3-to-2 communication instance, 1222–1223 for the 5-to-1 communication instance, 1226–1227 for the 2-to-1 communication instance, 1224–1225 for the 3-to-4 communication instance, 1228–1229 for the 3-to-3 communication instance, 1230–1231 for the 4-to-1 communication instance, 1232–1233 for the 3-to-4 communication instance, 1234–1235 for the 5-to-1 communication instance, and 1238–1239 for the 3-to-5 communication instance are shown. Three of the interactions are shown without drawing element identifiers (the 1-to-5 communication having a duration of 2, the 5-to-3 communication having a duration of 1, and the 3-to-5 communication having a duration of 4.

Note that transmitter 3, the critical resource, is booked solid until Time=104, a criteria which must be met in order to reach the theoretical minimum scheduling time. Note also that receiver 1, the second most critical resource, was booked solid until Time=94. While this logic doesn't always produce the theoretically optimum schedule, it is designed to be efficient with the resources having the highest demands.

If the scheduling process had applied to a 100 unit window of time increment of time rather than a 150 unit window of time increment, the very last request would have been precluded from being scheduled in this window of time increment, but would have been queued until the scheduling process was resumed for the next time window of time increment.

The above example showed a list of requests where all of the requests had priority levels of 1. In one embodiment, four different priority levels are supported. All of the highest level requests are scheduled according to the logic before any of the other priority requests are even considered for scheduling.

Once all of the guaranteed requests have been scheduled, connection requests from the other three priorities are scheduled around the guaranteed requests already in the schedule. When there are already connections in the schedule, the process of calculating the window of time increment size is a little more complex, but the logic is essentially the same. Though the ACR value (or SAV) is still the predominant factor in deciding what gets scheduled when, connection requests between the same two concurrent resources are selected based on priority. This means, for example, that the ACR logic may elect to schedule a low priority 4-to-5 communication instance request before it schedules a medium priority 4-to-2 communication instance request, but never before it schedules a medium priority 4-to-5 communication instance request.

Since there are requirements for certain connections to happen at a particular time rather than simply in some window of time increment of time, accommodations can be made for having these requests bypass scheduling. These fixed time connections are entered into the Event Table before scheduling begins and the scheduled connections must be worked in around the fixed connections. These fixed time connections obviously have the highest priority of any of the requests.

In the above example, advancing time was simply a matter of finding the next chronological finish of an already scheduled connection. However, the process of advancing time consumes cycles which might be better spent performing other functions. The network scheduler in the preferred embodiment uses a minimum time increment of 256 units (with a scheduling window of time increment of over 25,000 units rather than the 150 unit window of time increment described above) to reduce the processing requirements. While this does have an obvious negative impact on scheduling efficiencies, there is also a less obvious positive impact. On the average, more resources are candidates for scheduling at each time increment as a result of having processed more finishes between increments. With more resources contending simultaneously, those resources with higher critical impact values are less likely to be preempted by some other resource which had simply finished earlier. The end result of this compromise is that compute cycles are saved, but bandwidth efficiencies aren't substantially impacted.

In the above example, all requests were scheduled in their entirety—there was no need to break up the requests. Had any one of the requests been of a length longer than the defined window of time increment (150 units of time in the above example), however, it would have been segmented into at least two portions to enable scheduling. If a long message cannot be avoided by design, by breaking up the message and using a low priority attribute in this situation, long lower priority messages are less likely to preclude higher priority messages contending for the same resources.

In the preferred embodiment, requests greater than 1023 units are broken into 1000 unit "full" blocks and an optional "partial" block up to 1023 units in length.

In the preferred embodiment, the Itineraries (the particular messages used to convey the schedule) are themselves scheduled messages due to their varying, and potentially large, size. The Agendas (the messages used to collect the connection requests), however, are small and handled as fixed time connections (they are not literally scheduled). The scheduling pipeline used in the preferred embodiment involves collecting the agendas and scheduling the Itineraries in the first window of time increment, where the second, third, and fourth window of time increments are used as described (for scheduling the messages, conveying the schedule, and implementing the connections, respectively).

Figure 13:
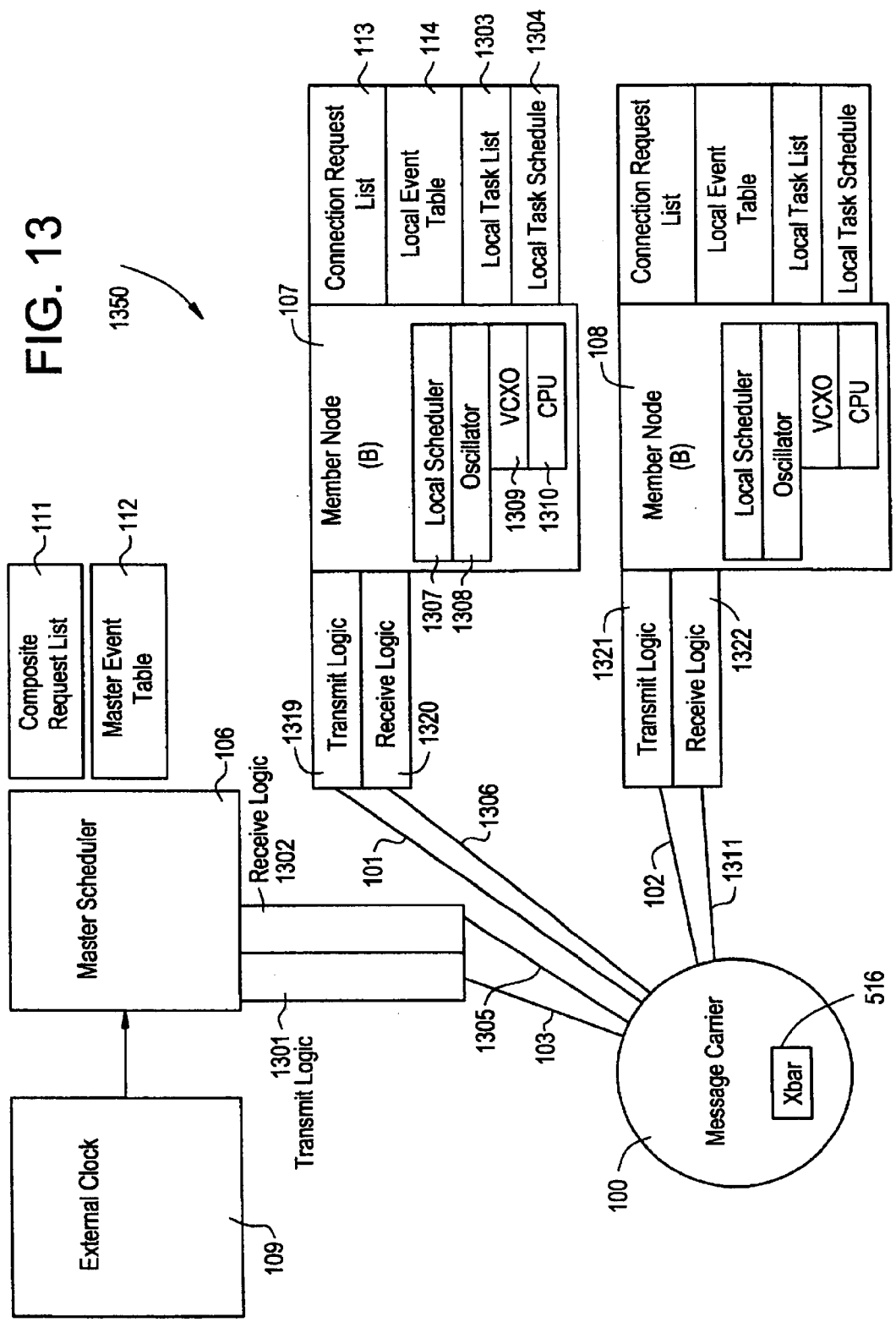
FIG. 13 provides a detailed composition of the Message Carrier, the Master Scheduler, the Clock, and the Member Nodes.

Turning now to FIG. 13, a more detailed representation of components respective to a member node 107, 108 is depicted. While FIG. 13 reprises a number of elements of FIGS. 1 and 5, details of logic types are shown enabling concurrent transmission and receipt of messages respective to the other nodes. In this regard, Transmit Logic 1301 and Receive Logic 1302 are shown for the Master Scheduler 106, with companion Transmit Logic 1319 and Receive Logic 1320 on member node 107 and further companion Transmit Logic 1321 and Receive Logic 1322 on member node 108. Pathways 1311, 1305, and 1306 show vectored message paths outbound from message carrier 100 (with crossbar switch 516). Such messaging approaches are achievable with a context cycling computer such as has previously been discussed, enabling a particular node 107, 108, 106 to be engaged in highly interleaved transmission and receipt of messages. Further detail showing the local scheduler 1307, oscillator 1308, CPU 1309, and VCXO (Voltage Controlled Crystal Oscillator) 1309 is shown for node 107 along with the previously discussed local task list 1303 and local task schedule 1304 which have also been discussed in general.

Figure 14:
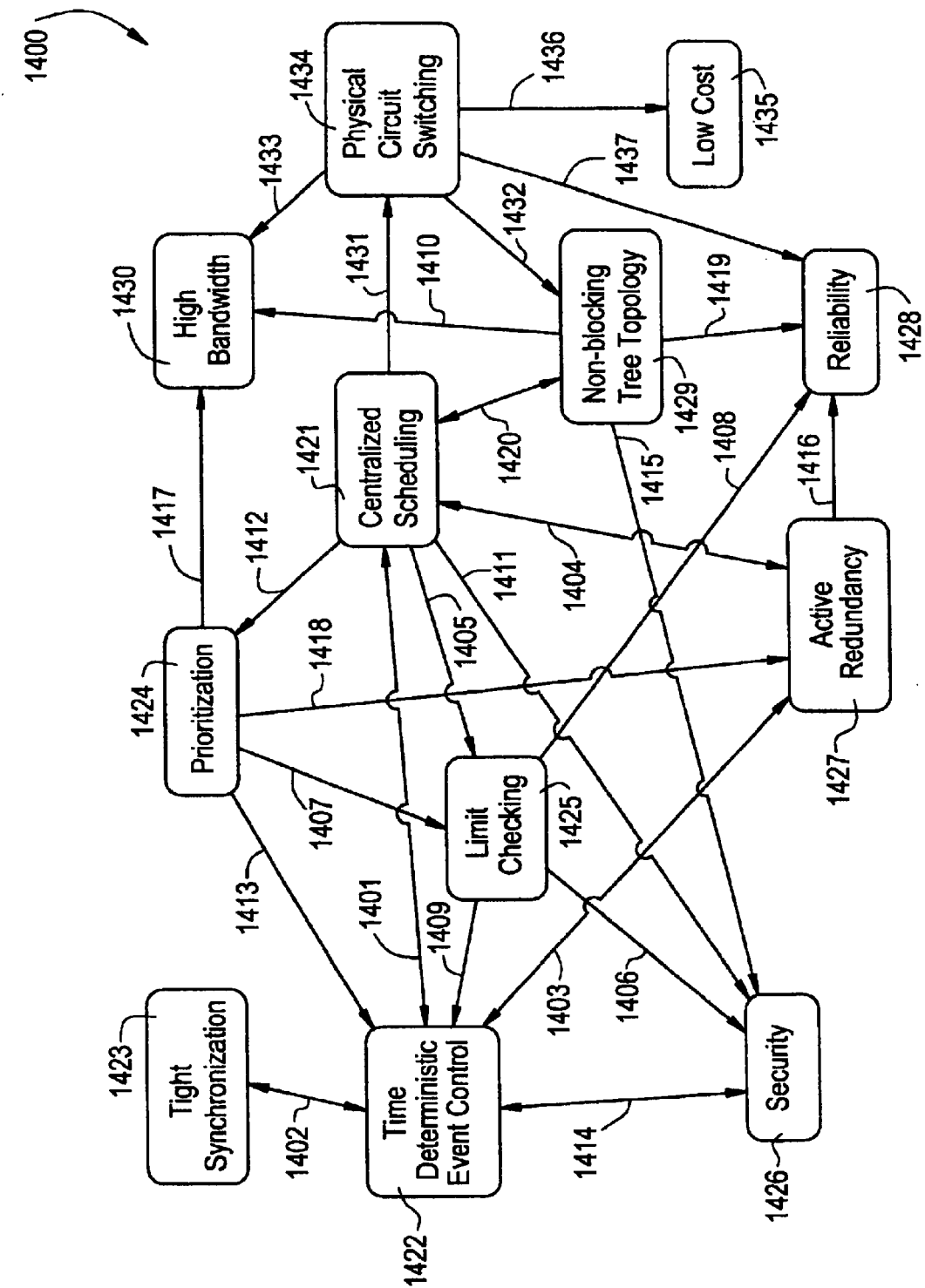
FIG. 14 shows the relationships between the technologies which have been combined in the preferred embodiment, with emphasis on those most critical to the application.

Turning now to FIG. 14, focus is directed to three technologies which, when combined, illustrate a unique and valuable abstracted characterization of considerations in networking distributed, real-time computers to further put the nature of the present invention into full perspective. In this regard key technologies relate to Tight Synchronization between computers; Time Deterministic operation, including network communications; and Centralized Scheduling of distributed tasks, particularly those involving network communications. This diagram shows the interrelationships 1400 between the various technologies implemented in the preferred embodiment, with emphasis on those technologies considered critical to the implementation. The fundamental technologies which, when combined, provide an architecture amenable to real time computing in a distributed computing environment are (1) Time Deterministic Event Control 1422; (2) Tight Synchronization 1423 between systems; and (3) Centralized Scheduling 1421 of the tasks critical to the operation of the real time systems in the distributed environment.

The relationships between the technologies are shown using arrows, where the arrowheads point from the enabling technology to the enabled technology, and where the term "enabling" is loosely used here to describe an improvement in the utility of that technology, or in the simplicity of applying the technology. Note that many of the technologies are mutually beneficial, as depicted with a double headed arrow.

The following table explains the relationships between the implementation characteristics as virtual linkages of FIG. 14 between the features and goals of tight synchronization 1423, prioritization 1424, time deterministic event control 1422, security 1426, limit checking 1425, centralized scheduling 1421, physical circuit switching 1434, non-blocking tree topology 1429, reliability 1428, active redundancy 1427, and low cost 1435 are interrelated in an abstracted characterization.

TABLE 33

Interactions of key technical features

| Connection In drawing | Quality |
|---|---|
| 1401 | Centralized scheduling assures that all network interactions occur at prescribed times. The first requirement for Time Determinism, by this description, is having the nodes on the network in tight synchronization. None of the network nodes can know the needs of the entire network, so in the absence of the central scheduler, the alternatives are to either remove all dynamics or to implement a solution tolerant of the variability. By |

TABLE 33-continued

Interactions of key technical features

| Connection In drawing | Quality |
|---|---|
| | incorporating centralized connection scheduling, prioritization, and limit checking, the (high priority) time critical interconnections can be time deterministic while the (low priority) high volume interconnections can exist through variability tolerant designs. |
| 1402 | In a distributed computing environment, deterministic networking can be achieved either with tightly synchronized systems, or by providing enough excess bandwidth to realize timely delivery in a worst case timing and bandwidth demand situation. Because such an analysis of worst case situation is difficult and because providing the excess bandwidth can be costly, synchronization is an enabling technology for Time Determinism. Additionally, the difficulty in achieving a desired level of synchronization is usually proportional to the extent that the communications are indeterminate. |
| 1403 | Active Redundancy enables Time Determinism primarily in regards to failure recovery. It is difficult to manage the possible failure scenarios in the absence of redundancy, yet it is also difficult to manage failure recovery in a Time Deterministic system with passive redundancy. Time Determinism facilitates the use of Active Redundancy in that one of the biggest challenges to active redundancy is in assuring that all sides operate identically. Furthermore, with a Time Deterministic environment, a redundant element of a system can be diagnosed as dysfunctional simply by noting that the appropriate actions aren't occurring at the prescribed times. The time deterministic network involves communicating based on time between separate computing elements. The fact that the communications are scheduled based on time facilitates the employment of active redundancy. In active redundancy, there are two or more computers which are each executing identical logics via its own sequence of program instructions, exchanging the results of this execution, and then arbitrating to come to a result. Due to the fact that the data received by each computer must be shared with the other computer(s) executing the same logic prior to arbitrating this data, there must be some mechanism by which the time to begin the arbitration process in determined. The mechanism which has been chosen is to provide time synchronization between the redundant computers and schedule the tasks related to the communications based on time. In this way, there is known the time at which the arbitration task can begin. |
| 1404 | One of the most difficult challenges in implementing active redundancy is in handling the variation between sides. All sides of a redundant system must be expected to match at defined checkpoints, and discrepancies must be resolved in order to retain the value in redundancy. All sides must know when a checkpoint has been reached, and rules must be defined to allow differences to be resolved. With centralized scheduling, variations in connection requests, either in content or in timing, can be reduced or even eliminated, thereby increasing the probability that all sides can maintain operational equivalence. On the other hand, centralized scheduling places a tremendous dependency on the availability of that scheduling element. Centralized scheduling becomes much more viable in the presence of redundancy. |
| 1405 | Centralized scheduling requires that all connection requests be assembled together for analysis. This permits limit checking to verify that (1) certain undesirable node-to-node combinations are prohibited and (2) traffic levels (possibly at a particular priority) between certain combinations of nodes doesn't exceed predefined levels. |
| 1406 | Limit checking enhances the security of the distributed computing system by assuring that certain restrictions aren't violated. These limit checks help against malicious attacks where certain systems shouldn't be allowed to interact with others, and against accidental complications such as overloading a system with legitimate low priority data or unintentional overloading of high priority data. |
| 1407 | Prioritization of the messages enhances the utility of the |

TABLE 33-continued

Interactions of key technical features

| Connection In drawing | Quality |
|---|---|
| | limit checking. Not only can the highest priority data be made time deterministic without excessively restricting the lower priority messages, but security measures can be put in place which take message priority into account. |
| 1408 | Limit checking improves the overall reliability of the system by preventing certain security risks and by retaining the time determinism. In the absence of limit checking, certain network faults could cripple the network, such as when a node were to accidentally request an excessive amount of traffic at the highest priority level. |
| 1409 | In the implementation of Limit Checking, the highest priority traffic is testing against throughput thresholds to assure that no errors on one channel preclude the highest priority messaging to take place between any nodes not including the node with errors. |
| 1410 | Non-blocking network architectures allow the network to realize throughputs higher than the throughput available to any particular node on the network. This translates to higher bandwidth at any particular price when compared to blocking architectures. |
| 1411 | Security can often be implemented more easily when a centralized security agent can be entrusted with the administration of the security policies. Specifically in the preferred embodiment, the central scheduler is given the security tables and the interconnecting systems can delegate the security task to the central authority, allowing the administration to be done in one place rather than in two. Furthermore, the same security policies don't have to be re-implemented in as many environments as can exist on the star. |
| 1412 | By introducing a centralized scheduler, the scheduling logic can be implemented so as to enforce prioritization on the received connection requests. |
| 1413 | Prioritization simplifies the task of implementing Time Determinism. This is because large but infrequent tasks such as program loading can be set to operate at a low priority, eliminating the analysis of this high impact operation would have on the simpler yet more critical task of peer to peer communications. |
| 1415 | On networks employing a broadcast protocol, all network nodes have the opportunity to view the data going to all other nodes (though encryption can make this viewing rather futile). Blocking protocols aren't always implemented in broadcast protocols, but non-blocking protocols preclude the possibility of broadcasting, thereby avoiding the obvious security risks. |
| 1416 | One of the obvious ways of achieving reliability is in the introduction of redundancy. |
| 1417 | High throughput, the primary objective of high bandwidth, is positively impacted in two ways through the introduction of prioritization. First, there is the perception of high throughput in that the data that has the most value is delivered in a more timely fashion by invoking prioritization. Secondly, higher volumes of data can be permitted knowing that the high priority data, which often must be delivered in a timely fashion, won't be sacrificed by permitting large volumes of low priority traffic to be requested. |
| 1418 | Active Redundancy requires that a failed element be capable of recovering from downtime. This often involves the exchange of historical data from the elements which did not fail. In order to minimize the impact of this exchange, prioritization can be introduced assuring that the recovering element can recover and that it can do so without a substantial detrimental impact on the healthy elements. |
| 1419 | Certain architectures and topologies are inherently at risk of network outages in the presence of system outages. Use of a non-blocking architecture and physical circuit switching, while not the only means to achieve a higher reliability, offers a level of isolation from network node faults. |
| 1420 | Centralized scheduling is an enabling technology for effectively using the bandwidth available to non-blocking |

TABLE 33-continued

Interactions of key technical features

| Connection In drawing | Quality |
|---|---|
| | networking architectures such as those implementing certain crossbar switches. In the absence of scheduling, fixed connection patterns must be implemented, thereby reducing the practical throughput available to the nodes. |
| 1431 | Physical Circuit Switching technology can be difficult to implement for several reasons, including challenges associated with determining what circuits should be put in place at any particular time. By knowing the needs ahead of time, the connection patterns for the circuit switch can be determined a priori and implemented as needed. |
| 1432 | Circuit switching of systems configured in a tree topology can be implemented with a separate circuit, or pair of circuits, for each system on the network. This allows each channel to have its own path for communications, permitting a non-blocking architecture. |
| 1433 | Because physical circuit switching can reduce the requirement for active circuitry, high line speeds can often lead to higher network bandwidths. |
| 1436 | The simplicity of the circuitry associated with physical circuit switching often permits a given set of capabilities to be implemented at a lower cost. |

Figure 15:
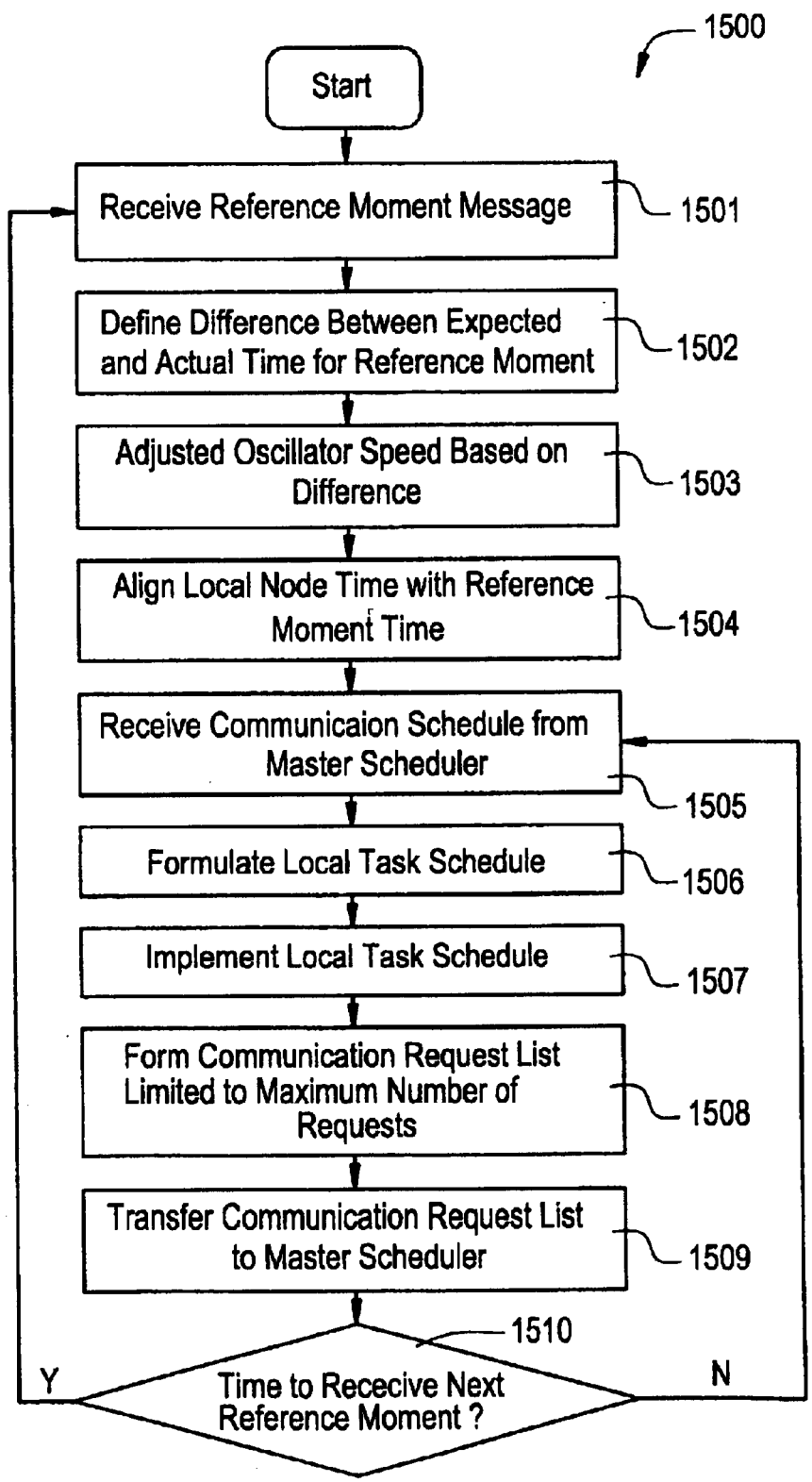
FIG. 15 presents a flowchart of the logic which executes in each of the computing elements in order to facilitate communication between the member nodes.

Turning now to FIG. 15, the general process 1500 executed respective to scheduling in each member node 108, 107 (any one of control computer 506, historian computer 507, control computer 504, historian computer 505, user interface 503, network support 502, and network switch 501) is discussed. Each member node 108, 107 is responsible for receiving the common clock signal; synchronizing to that common clock signal; receiving the local event table 114, 116 from the master scheduler 106 in network switch 501; formulating the task execution list based on the received local event table 114, 116 and merging in any additional tasks which are not described in the local event table 114, 116; executing the task execution list; generating the request list of communications; and transmitting the request list of communications to the master scheduler 106 in network switch 501.

Steps 1501 and 1502—Since the network is so highly dependent on a global time base, the first step 1501 at a member node 108, 107 is to receive the common clock signal. The clock signal is communicated as a message from the master scheduler 106 in network switch 501 to each of the member nodes 108, 107. The member node 108, 107 receives this clock signal in step 1501, stamps the actual time of reception, and validates the integrity of this message. The validated message is used as an input to the process of synchronization and, in step 1502, the difference between the expected and actual times of time message receipt is optionally determined (optionally if the nature of the time message is a pulse instead of a data bearing message).

Steps 1503 and 1504—Each member node 108, 107 must now synchronize to the common clock signal. The process of performing this synchronization can be broken up into two separate tasks: first, in step 1503, the adjustment of a voltage controlled oscillator (1308) to a frequency which matches the source of the common clock signal and second, in step 1504, the alignment of the time such that the start of each time period which is defined by the common clock signal occurs at the same time in the member nodes 108, 107 as it does in the master scheduler 106 in network switch 501.

Step 1505—Once the synchronization of a member node 108, 107 to the master scheduler 106 in network switch 501 is complete, the member node 108, 107 must receive the local event table 114, 116 from the master scheduler 106 in network switch 501. The local event table 114, 116 contains the schedule for the communications which are involving this member node. Note that the reception of the local event table 114, 116 itself is scheduled by the master scheduler 106 in network switch 501. Therefore, the first time that the node is to receive the local event table 114, 116 it must be available to receive that message at any possible time that the local event table 114, 116 might be received.

Step 1506—The next step for the member node 108, 107 is to formulate the task execution list. The task execution list is formulated from the local event table 114, 116 and the additional tasks which the member node 108, 107 must do which are not described in the local event table 114, 116. The local event table 114, 116 which is communicated from the master scheduler 106 in network switch 501 provides the timing associated with the transmission and reception tasks. In order to formulate the task execution list, the following sub-steps must be taken:

Substep 1506A: Adjust the start time received from the master scheduler 106 in network switch 501 to account for the propagation delay. The timing which is received from the master scheduler 106 in network switch 501 is relative to the master scheduler 106 in network switch 501. Although the member node 108, 107 is synchronized with the master scheduler 106 in network switch 501, there is still an inherent delay in the propagation through the media being communicated. Either this delay must be accounted for by the master scheduler 106 in network switch 501, the member node, or the communication window of time increment must be sufficiently large that the inherent delay is included as overhead in the time allotted to the connection. In the preferred embodiment, this delay is accounted for in the member node.

Substep 1506B: Schedule the tasks which are dependent on the communication tasks. There are tasks which must be scheduled prior to a transmission (for example, the transfer of the data to be transmitted from memory); there are also tasks which must be scheduled after a reception (for example, the arbitration of the data between the multiple, different sources in a redundant computing environment and the transfer of data to memory). The member node 108, 107 is responsible for the scheduling of these tasks.

Substep 1506C: Schedule the tasks which are neither described by the local event table 114, 116 nor are dependent on the communications. There are tasks which the member node 108, 107 must accomplish in addition to communication related tasks. These tasks may be for the operation of other I/O, localized display, etc.

Step 1507—The next step for the member node 108, 107 is to execute the task execution list. Each task in the list contains the task which is to be executed, the start time for the task, and any parameters which are necessary in order to successfully complete the task.

Step 1508—The member node 108, 107 can now formulate the communication request list, which is a list of the member nodes 108, 107 to which this member node 108, 107 is desiring to communicate. The information which is included in this communication request list is the source node identifier, destination node identifier, and the total length of the communication.

Step 1509—This communication request list is communicated to the master scheduler 106 in network switch 501 for consideration in its scheduling. At this point, the member node 108, 107 has performed all of the necessary functions in a particular time period. The next step 1510 is to determine whether or not it is time to receive the next reference moment message. If it is, then the entire process repeats itself starting with the very first step 1501 of receiving the reference moment message. If it is not time to receive the next reference moment message, then the logic of the member node may forward to step 1505.

Figure 16:
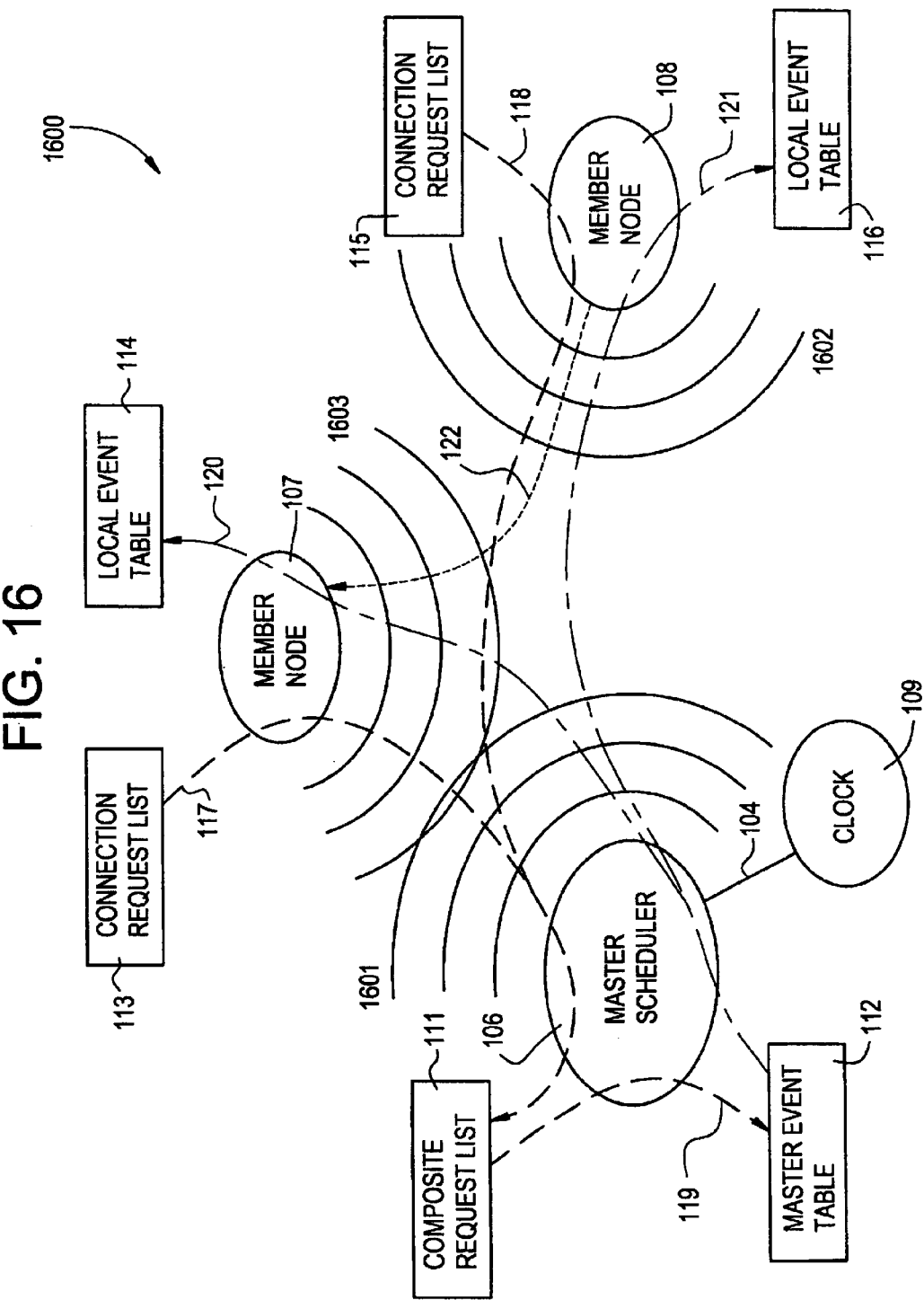
FIG. 16 depicts a diagram of the data flows between the various elements in a distributed network where communications are facilitated by radio frequency.

As one contemplated embodiment, FIG. 16 presents the general data flow diagram 130 of FIG. 1 as a data flow diagram 1600 where communications are effected via radio frequency means and transmissions 1601, 1602, and 1603 are effected via radio frequency transmitters and receivers.

The present invention is enabled through use of machines which are considered as a special purpose computers created in one embodiment by combining a computer with computer program code (alternatively termed, e.g., software or logic, where logic denotes software in and for execution by an enabling system of electrical circuitry) directed to the particular function of process control so that, when connected to an electrical power source, powered by electricity, and activated to execute its computer program code (software), the special purpose computer executes the particular function related to the present invention pursuant to the instructions from the computer program code. The computer has electrically activated components denoted as a central processing unit, at least one physical memory connected to the central processing unit, an optional input keyboard connected to the central processing unit, an optional output display (which can include, without limitation, a printer, printing terminal where output is printed on paper, cathode ray tube monitor, and/or flat panel monitor) connected to the central processing unit, a computer clock pulse generator, and a connection to electrical power for energizing all of the electrically activated components of the computer. The central processor further has a control bus and specific computer circuits for either temporarily holding data (e.g., a register or an accumulator) or for executing a fundamental data processing operation (e.g., an addition circuit); the specific computer circuits are connected in communication to the control bus through latching circuits which can individually be in either a conducting (communicating) or non-conducting (non-communicating) configuration; the collective configurations of all the latching circuits at a particular moment define a particular state of the central processor; and the state of the central processor is respectively modified and changed as the individual instructions of the computer program code are sequentially accessed by the central processing unit and output from the clock pulse generator is directed to the latches. The computer optionally also has computer program code in the form of a commercially available operating system which functions as a computer program code platform for enabling the execution of the special purpose computer program code directed to the particular function of the present invention. In overview, the present invention in this embodiment is implemented in the preferred embodiment by and through a plurality of computers which have been programmed to contribute to technology by performing the specifically useful purpose and practical application of the described system; each computer functions as a medium for realizing the functionality provided by the computer program code's functionality. In some embodiments, some communication linkages within an extended form of the special purpose computer may be implemented by electrical, optical, or radio-frequency signal communication interfaces and communication media which collectively use electrically-powered transmitter and receiver components which are directly or indirectly linked to at least one central processing unit.

The computer program code resident within a computer provides at least one component part of that machine. The computer program code may be in the form of, without limitation, inter-linked modules, routines and subroutines, program objects, and/or installed interactive processes. In some emergent computer designs, enabled by modern application specific integrated circuitry (ASIC) technology, computer program code may be at least partially expressed in hardwired circuitry reminiscent of traditional hardwired gate arrangements which execute simplified logical scenarios without need for a clock pulse. The Figures of this description show a number structural relationships between key modules and components within the computer program code and other aspects of the invention which enable the functionality of the machine of the present invention to be realized; in this regard, the computing elements in the system are constructed out of a combination of hardware and software.

The present invention has been described in an illustrative manner. In this regard, it is evident that those skilled in the art, once given the benefit of the foregoing disclosure, may now make modifications to the specific embodiment described herein without departing form the sprit of the present invention. Such modifications are to be considered within the scope of the present invention which is limited solely by the scope and spirit of the appended claims.

We claim:

1. A computer implemented method for enabling a plurality of computer nodes in mutual data communication, through a circuit switching message carrier having a communications and scheduling pipeline and supporting multiple communication paths simultaneously without providing additional data communication paths for each member node to use for sending communication request lists or receiving the communications schedule, to execute logic in a coordinated manner, comprising:

aligning real-time time between said plurality of computer nodes so that each computer node has essentially the same real-time time;

defining a schedule of communications for each computer node, each communication in said schedule having a duration time less than a fixed communication time value for all nodes in said plurality of nodes, said schedule having a different time in the future defined for initiating each respective communication;

communicating each schedule to its respective computer node; and initiating each communication from each node at the time defined in its schedule.

2. A computer network architecture, comprising:

a circuit switching message carrier having a communications and scheduling pipeline and supporting multiple communication paths simultaneously without providing additional data communication paths for each member node to use for sending communication request lists or receiving the communications schedule;

a plurality of computers coupled to said message carrier, said computers being programmed to perform time-deterministic tasks by cycling through a plurality of different operating states, including a communication state;

a clock system accessible by all said computers for maintaining time synchronism among said computers; and a scheduler coupled to said message carrier for determining the sequence of communication between said computers by causing said message carrier to establish communication between selected computers based on said time-deterministic tasks being performed by said computers, said sequence determined from a set of communications wherein each communication of said set has a duration time less than a fixed communication time value for all computers in said plurality of computers.

3. A computer implemented method for enabling a computer node in a plurality of computer nodes to execute logic in coordination with the other nodes in said plurality of computer nodes, comprising:

connecting a circuit switching message carrier, having a communications and scheduling pipeline and supporting multiple communication paths simultaneously without providing additional data communication paths for each member node to use for sending communication request lists or receiving the communications schedule, to each computer node in said plurality of computer nodes;

providing master scheduling capability in one computer node to establish a master scheduler;

defining, in each computer node, a communication request list of each communication needed by said computer node with any other computer node respective to a future time period, each communication in said request list having a duration time less than a fixed communication time value for all nodes in said plurality of nodes;

sending said communication request list from each computer node to said master scheduler via said message carrier;

receiving, in each computer node, a communication schedule from said master scheduler via said message carrier;

defining, in each computer node, a local task schedule from said communication schedule.

4. A computer implemented method for enabling a plurality of member nodes to execute logic in a coordinated manner, comprising:

connecting a circuit switching message carrier, having a communications and scheduling pipeline and supporting multiple communication paths simultaneously without providing additional data communication paths for each member node to use for sending communication request lists or receiving the communications schedule, to each member node in said plurality of member nodes;

providing a master scheduler in data communication with each said member node via said message carrier;

defining a reference moment time value for said plurality of member nodes;

communicating said reference moment time value to each member node and said master scheduler via said message carrier;

defining a communication request list in each said member node showing each communication needed by said member node with any other member node in a future time period, each communication in said request list having a duration time less than a fixed communication time value for all nodes in said plurality of nodes;

communicating said communication request list from each member node to said master scheduler via said message carrier;

defining, in said master scheduler, scheduled communications between member nodes at communication event times respective to said reference moment time value and also respective to each said communication listed in each said received communication request list;

defining, in said master scheduler, a communication schedule for each member node respective to said scheduled communications;

sending each said communication schedule from said master scheduler to each respective member node via said message carrier;

defining, in each member node, the difference in time between said reference moment time value and the time when said reference moment time value is communicated into said member node;

defining, in each member node, a local task schedule from said communication schedule and from said difference in time for the member node so that the member node will communicate to other member nodes via said message carrier at said scheduled communication event times;

executing said scheduled communications between said member nodes respective to each scheduled communication via said message carrier according to said respective local task schedules.

5. The method of claim 4 wherein said step of defining a reference moment time value is performed by said master scheduler.

6. The method of claim 4 wherein said step of defining a communication request list in each said member node limits said communications to a maximum number in said future time period.

7. The method of claim 4 wherein each communication has a duration time attribute.

8. The method of claim 4 wherein the step defining a reference moment time value for said plurality of member nodes is done by a global time system.

9. A computer implemented method for enabling a plurality of member nodes to execute logic in a coordinated manner, comprising:

connecting a circuit switching message carrier, having a communications and scheduling pipeline and supporting multiple communication paths simultaneously without providing additional data communication paths for each member node to use for sending communication request lists or receiving the communications schedule, to each member node in said plurality of member nodes, each node having a central processing unit;

providing a master scheduler in data communication with each said member node via said message carrier;

defining a reference moment time value as a moment in time for said plurality of member nodes;

communicating said reference moment time value to each member node and said master scheduler via said message carrier;

defining into a communication request list in each said member node, each access to any other member node needed by said member node in achieving a future task increment respective to a future time period, each communication in said request list having a duration time less than a fixed communication time value for all nodes in said plurality of nodes;

communicating said communication request list from each said member node to said master scheduler via said message carrier;

defining, in said master scheduler, a communication event data object respective to each said access to any other member node needed by said member node in achieving a future task increment, said communication event data object having an accessing member identification attribute value, an accessed member identification attribute value, and an access duration attribute value;

collecting, in said master scheduler, all defined communication event data objects into a communication event set;

determining in said master scheduler a summed accessed value for each member node in said communication event set as a sum of all access duration attribute values in all communication event data objects having an accessed member identification attribute value respective to said member node;

determining in said master scheduler a summed accessing value for each member node in said communication event set as a sum of all access duration attribute values in all communication event data objects having an accessing member identification attribute value respective to said member node;

scheduling in said master scheduler and into the earliest available time in a schedule, a future communication task respective to said reference moment time value between the accessing member node having the highest said summed accessing value respective to said communication event set and the accessed member node respective to the accessed member identification attribute value in the communication event data object having the highest affiliated access duration attribute value for all communication event data objects respective to said accessing member node, said future communication task having a task initiation time equal to the earliest available time in the schedule, an accessing member node identifier attribute respective to the accessing member, and an accessed member node identifier attribute respective to the accessed member node;

removing, in said master scheduler, the communication event data object respective to the accessed member node identifier attribute in the scheduled future communication task and the accessed member node identifier attribute in the scheduled future communication task to redefine the communication event set to those communication event data objects which have not been scheduled; and repeating, in said master scheduler, respective to the redefined communication event set, the steps of determining a summed accessed value, determining a summed accessing value, scheduling a future communication task, and removing all communication event data objects respective to scheduled member nodes until all communication event data objects have been scheduled into a communication schedule for each member node;

sending each said communication schedule from said master scheduler to each respective member node via said message carrier;

defining, in each member node, the difference in time between said reference moment time value and the time when said reference moment time value is communicated into said member node;

defining, in each member node, a local task schedule from said communication schedule and from said difference in time for the member node so that the member node will communicate to other member nodes via said message carrier at said scheduled communication event times; and executing said scheduled communications between member nodes respective to each scheduled communication event via said message carrier according to said respective local task schedules.

10. A computer implemented method for scheduling communications between member objects in a plurality of member objects functioning as a collective group, comprising the steps of:

providing a computer;

defining in said computer, for each member object, a communication event data object respective to each access to any other member object needed by said member object in achieving a future task increment, said communication event data object having an accessing member identification attribute value, an accessed member identification attribute value, and an access duration attribute value less than a fixed communication time value for all member objects in said plurality of member objects;

collecting, in said computer, all defined communication event data objects into a communication event set;

determining, in said computer, a summed accessed value for each member object in said communication event set as a sum of all access duration attribute values in all communication event data objects having a accessed member identification attribute value respective to said member object;

determining, in said computer, a summed accessing value for each member object in said communication event set as a sum of all access duration attribute values in all communication event data objects having an accessing member identification attribute value respective to said member object;

defining a set of sequential future time increments within a scheduling period respective to a schedule;

scheduling, in said computer, into the earliest available time in the first of said future time increments, a future communication task based on the first available communication event data object in said communication event set between
- the accessing member object having the highest said summed accessing value respective to said communication event set and
- the accessed member object having the highest said summed accessed value respective to said communication event set if a communication event data object exists between said accessed member object and said accessing member object, said future communication task having a task initiation time equal to the earliest available time in the schedule, an accessing member object identifier attribute respective to the accessing member object, an accessed member object identifier attribute respective to the accessed member object, and said access duration attribute value;

removing from scheduling candidacy, in said computer, the communication event data object respective to the accessed member object identifier attribute in the scheduled future communication task and the accessing member object identifier attribute in the scheduled future communication task to redefine the communication event set to those communication event data objects which have not been scheduled;

repeating, in said computer respective to the redefined communication event set, the steps of determining a summed accessed value, determining a summed accessing value, scheduling a future communication task, and removing all communication event data objects respective to scheduled member objects until all communication event data objects have been scheduled which can be scheduled into said first future time increment; and recurrently executing, in said computer respective to the redefined communication event set and sequentially respective to each of the remaining of said plurality of future time increments, the steps of determining a summed accessed value, determining a summed accessing value, scheduling a future communication task, and removing all communication event data objects respective to scheduled member objects, and repeating such steps until all communication event data objects have been scheduled which can be scheduled into each said future time increment and until all communication event data objects have been scheduled into said scheduling period.

11. The method according to 10, wherein said defining is confined to future task increments which are needed within a predefined time period and said scheduling is respective to said predefined time period.

12. The method according to 11, further comprising the step of connecting a message carrier to each member object in said plurality of member objects, said message carrier having a plurality of channels for permitting concurrency in said communication events, said step of scheduling being respective to said plurality of channels as a group wherein said earliest available time is respective to any channel in said message carrier.

13. The method according to claim 12 wherein each said member object is a member node being in data communication with said message carrier, each member node having a central processing unit.

14. A computer implemented method for scheduling tasks for resource objects in a plurality of resource objects functioning as a collective group, comprising the steps of:

providing a computer;

defining, in said computer, a set of future tasks for said collective group;

defining, in said computer, each resource object needed for each future task in said set of future tasks;

defining, in said computer, each interaction needed between any two resource objects respective to said set of future tasks;

defining, in said computer, a use instance for each said resource object in achieving each said interaction, said use instance having a use duration attribute value less than a fixed communication time value for all resource objects in said plurality of resource objects;

defining, in said computer, an accessing resource object and an accessed resource object respective to each said use instance;

firstly determining, in said computer, a summed accessing time value for each accessing resource object as a sum of all use duration attribute values for all said use instances respective to that resource object when it is the accessing resource object;

secondly determining, in said computer, a summed accessed time value for each accessed resource object as a sum of all use duration attribute values for all said interactions between said accessed resource object and said accessing resource object;

defining, in said computer, a set of sequential future time increments within a scheduling period respective to a schedule;

scheduling, in said computer, into the earliest available time in the first of said future time increments, a future resource interaction event based on the first available future task in said set of future tasks between
- the accessing resource object having the highest said summed accessing value respective to said set of future tasks and
- the accessed resource object having the highest said summed accessed value respective to said set of future tasks if a use instance exists between said accessed resource object and said accessing resource object, said future resource interaction event having an initiation time equal to the earliest available time in the schedule, an accessing resource object identifier attribute respective to the accessing resource object, an accessed resource object identifier attribute respective to the accessed resource object, and said use duration attribute value;

removing from scheduling candidacy, in said computer, the use instance respective to the accessed resource object in the scheduled future resource interaction event and the accessing member object identifier attribute in the scheduled future resource interaction event to redefine the set of future tasks to those future tasks for which interactions have not been scheduled;

repeating, in said computer, respective to the redefined future task set, the steps of determining a summed accessed value, determining a summed accessing value, scheduling a future communication task, and removing all use instances respective to scheduled resource objects until all use instances have been scheduled which can be scheduled into said first future time increment; and recurrently executing, in said computer, respective to the redefined future task set and sequentially respective to each of the remaining of said plurality of future time increments, the steps of determining a summed accessed value, determining a summed accessing value, scheduling a future resource interaction event, removing all resource objects respective to scheduled resource objects, and repeating such steps until all resource interaction events have been scheduled which can be scheduled into each future time increment and until all resource interaction events have been scheduled into said scheduling period.

15. A computer implemented apparatus for enabling a plurality of computer nodes in mutual data communication, through a circuit switching message carrier having a communications and scheduling pipeline and supporting multiple communication paths simultaneously without providing additional data communication paths for each member node to use for sending communication request lists or receiving the communications schedule, to execute logic in a coordinated manner, comprising:

means for aligning real-time time between said plurality of computer nodes so that each computer node has essentially the same real-time time;

means for defining a schedule of communications for each computer node, said schedule having a different time in the future defined for initiating each respective communication, each communication in said schedule having a duration time less than a fixed communication time value for all nodes in said plurality of nodes;

means for communicating each schedule to its respective computer node;

means for initiating each communication from each node at the time defined in its schedule.

16. A computer-implemented apparatus having a circuit switching message carrier having a communications and scheduling pipeline and supporting multiple communication paths simultaneously without providing additional data communication paths for each member node to use for sending communication request lists or receiving the communications schedule, comprising:

a plurality of member nodes, each member node being in data communication with said message carrier, each member node having a central processing unit, time phase logic for receiving from said message carrier a reference moment message having a reference moment time value and for defining the difference in time between said reference moment time value and the time of receiving said reference moment message, communication definition logic for identifying each internodal communication needed by said member node in a future time period and for establishing a communication request list respective to all said internodal communications, each communication having a duration time less than a fixed communication time value for all nodes in said plurality of nodes, communication request sending logic for communicating said communication request list via said message carrier to a master scheduler, communication task receiving logic for receiving a communication schedule via said message carrier from said master scheduler, task integration logic for defining a local task schedule from said communication schedule and said difference in time, and communication implementation logic for communicating via said message carrier with other member nodes according to said local task schedule; and a master scheduler in data communication with said plurality of member nodes via said message carrier, said master scheduler having scheduler logic executed by a central processing unit, said scheduler logic having reference moment definition logic for defining said reference moment time value as a moment in time, reference moment communication logic for creating a reference moment message having said reference moment time value and for communicating said reference moment message via said message carrier to each member node, communication request receiving logic for receiving each said communication request list from each said member node via said message carrier, communication schedule definition logic for scheduling communications between member nodes at communication event times respective to said reference moment time value and also respective to each said internodal communication listed in each said received communication request list and for further defining a communication schedule for each member node respective to said scheduled communications, and member node communication schedule response logic for sending each said communication schedule to each respective member node via said message carrier.

17. The apparatus of claim 16, wherein each member node further comprises a variable speed oscillator.

18. The apparatus of claim 16, wherein each member node further comprises time alignment logic and oscillator rate adjustment logic.

19. The apparatus of claim 16, wherein said message carrier comprises a crossbar switch.

20. The apparatus of claim 16, wherein said message carrier comprises a network topology.

21. The apparatus of claim 16, wherein said message carrier comprises a radio frequency communications system.

22. The computer implemented method of claim 16 in a redundant configuration where redundant end node and master scheduler transmitters each send their respective messages, and redundant end node receivers and the master scheduler receiver implement a multi-point mechanism to automatically repeat messages from the redundant computer nodes thereby reducing the impact of a network failure and enabling active redundancy.

23. A computer implemented method for enabling a plurality of computer nodes in mutual data communication to execute logic in a coordinated manner, comprising:

aligning real-time time between said plurality of computer nodes so that each computer node has essentially the same real-time time;

defining a schedule of communications for each computer node, each communication in said schedule having a duration time less than a fixed communication time value for all nodes in said plurality of nodes, said schedule having a different time in the future defined for initiating each respective communication;

communicating each schedule to its respective computer node;

initiating each communication from each node at the time defined in its schedule;

wherein, said plurality of computer nodes in mutual data communication uses a circuit switching message carrier.

24. The computer implemented method of claim 23 wherein said plurality of computer nodes has a communications and scheduling pipeline.

25. The computer implemented method of claim 23 wherein said plurality of computer nodes supports multiple communication paths simultaneously.

26. A computer network, comprising:

a message carrier supporting multiple communication paths, a plurality of computers coupled to said message carrier, said computers being programmed to perform time-deterministic tasks by cycling through a plurality of different operating states, including a communication state;

a clock system accessible by all said computers for maintaining time synchronism among said computers;

a scheduler coupled to said message carrier for determining the sequence of communication between said computers by causing said message carrier to establish communication between selected computers based on said time-deterministic tasks being performed by said computers, said sequence determined from a set of communications wherein each communication of said set has a duration time less than a fixed communication time value for all computers in said plurality of computers;

wherein, said message carrier comprises a circuit switching message carrier.

27. The computer implemented network of claim 26 wherein said message carrier has a communications and scheduling pipeline.

28. The computer implemented network of claim 26 wherein said message carrier supports multiple communication paths simultaneously.

* * * * *